US008767292B2

(12) United States Patent
Tamaoki et al.

(10) Patent No.: US 8,767,292 B2
(45) Date of Patent: Jul. 1, 2014

(54) LASER APPARATUS

(75) Inventors: Shinobu Tamaoki, Yokohama (JP); Motoki Kakui, Yokohama (JP)

(73) Assignee: Megaopto Co., Ltd., Wako-shi (JP)

( * ) Notice: Subject to any disclaimer, the term of this patent is extended or adjusted under 35 U.S.C. 154(b) by 302 days.

(21) Appl. No.: 13/007,300

(22) Filed: Jan. 14, 2011

(65) Prior Publication Data

US 2011/0176203 A1 Jul. 21, 2011

Related U.S. Application Data

(60) Provisional application No. 61/295,391, filed on Jan. 15, 2010.

(51) Int. Cl.
*H04B 10/12* (2006.01)
(52) U.S. Cl.
USPC ........................................ 359/349; 359/341.1
(58) Field of Classification Search
USPC ............................................... 359/341.1, 349
See application file for complete search history.

(56) References Cited

U.S. PATENT DOCUMENTS

| | | | |
|---|---|---|---|
| 6,597,836 B2 * | 7/2003 | Johnson et al. | 385/33 |
| 7,075,712 B2 * | 7/2006 | Kinoshita et al. | 359/349 |
| 7,119,950 B2 * | 10/2006 | Ohshima et al. | 359/349 |
| 7,343,098 B2 * | 3/2008 | Gerwe et al. | 398/120 |
| 7,440,174 B2 * | 10/2008 | Rice et al. | 359/341.1 |
| 2008/0304137 A1 * | 12/2008 | Kakui et al. | 359/341.3 |
| 2009/0273828 A1 * | 11/2009 | Waarts et al. | 359/341.1 |

FOREIGN PATENT DOCUMENTS

| | | |
|---|---|---|
| CN | 1406016 A | 3/2003 |
| JP | 2000-200747 A | 7/2000 |
| JP | 2007-042981 | 2/2007 |
| JP | 2009-534850 A | 9/2009 |

OTHER PUBLICATIONS

Office Action issued in Chinese Patent Application No. 201110021099.X dated Nov. 21, 2013.
Office Action in Japanese Patent Application No. 2010-006958, dated Jan. 21, 2014.

* cited by examiner

*Primary Examiner* — Eric Bolda
(74) *Attorney, Agent, or Firm* — Venable LLP; Michael A. Sartori

(57) ABSTRACT

The present invention relates to a laser apparatus capable of supplying laser beams from each of plural beam emitting ends constituting laser beam output ports, and realizes the overall low power consumption and low non-linearization. The laser apparatus comprises a seed light source, beam emitting ends, an intermediate optical amplifier, an optical branching device, and final-stage optical amplifiers. The number of beam emitting ends is greater than the number of seed light sources, and the final-stage optical amplifiers and the beam emitting ends correspond to each other one-on-one. The optical branching device includes an input port associated to the seed light source and plural output ports associated to the respective beam emitting ends so as to constitute a part of the light paths between the seed light source and the beam emitting ends. The intermediate optical amplifier is disposed on the light path between the seed light source and the optical branching device, while the final-stage optical amplifiers are respectively disposed on the branch lines between the beam emitting ends and the optical branching device.

16 Claims, 16 Drawing Sheets

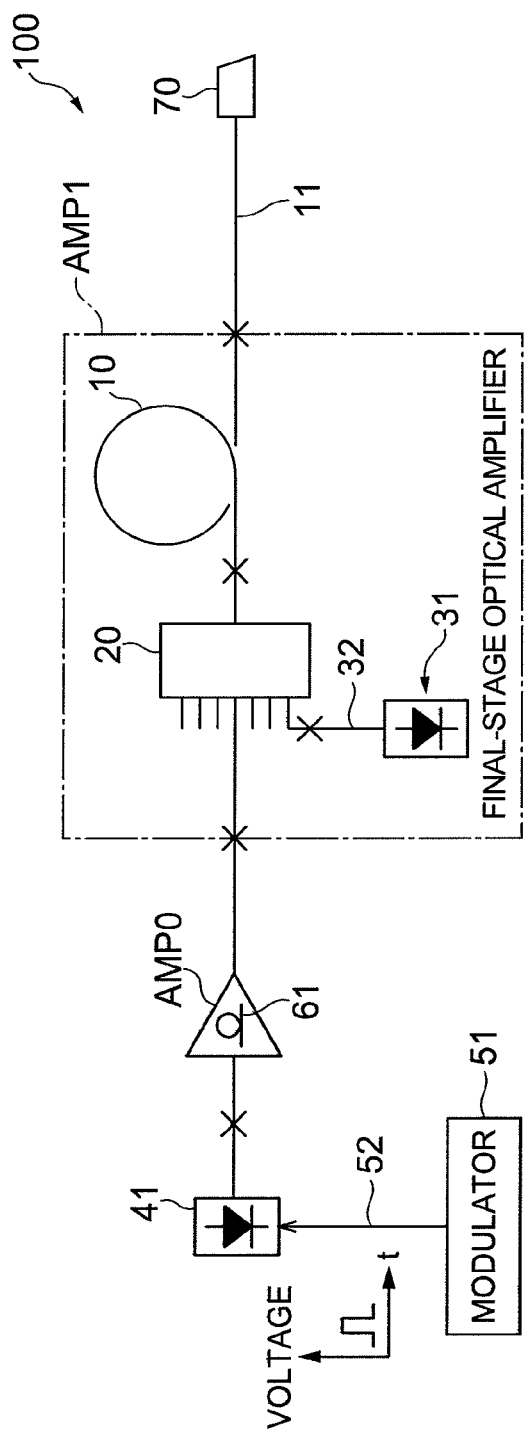
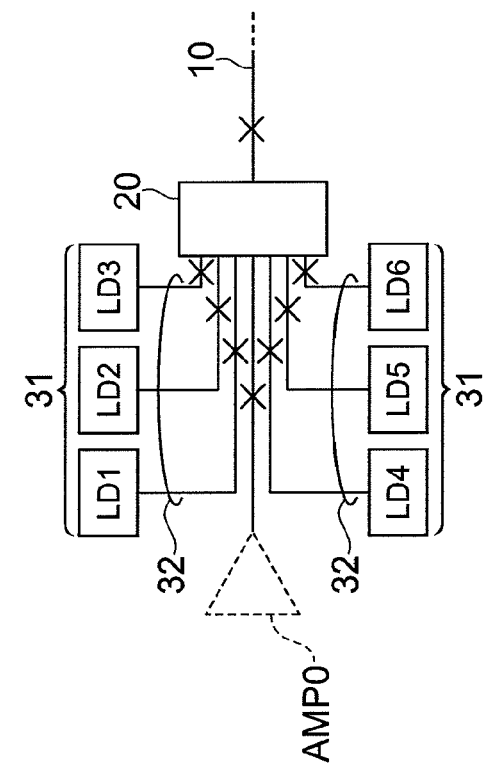

LASER APPARATUS

CROSS-REFERENCE TO RELATED APPLICATION

This application claims priority to Provisional Application No. 61/295,391 filed on Jan. 15, 2010 by the same Applicant, which is hereby incorporated by reference in its entirety.

BACKGROUND OF THE INVENTION

1. Field of the Invention

The present invention relates to a laser apparatus comprising plural beam emitting ends serving as a laser beam output port.

2. Related Background Art

Today, processing technology employing a pulsed laser beam (obtained by pulsing and repeatedly outputting a laser beam at a predetermined cycle) is attracting attention, and demands for a high output laser apparatus are increasing in the fields for processing and medical use. There is an optical fiber laser as a laser apparatus that is particularly attracting attention among the seed laser apparatuses. This optical fiber laser adopts, as the light amplifying medium, an amplification optical fiber in which rare earth elements such as Yb (ytterbium), Er (erbium), Tm (thulium) and the like are doped. When pumping light is supplied into this amplification optical fiber, the seed light propagating in the amplification optical fiber is amplified. Consequently, high power amplified light is outputted from the amplification optical fiber or, by performing laser oscillation with a resonator structure, laser beam is outputted from the amplification optical fiber. Some advantages of the optical fiber laser are, for example, the handling of the laser beam is easy since it is confined in the optical fiber, and large-scale cooling equipment is not required since the thermal radiation characteristics are favorable.

As described above, a rare earth-doped optical fiber is used as the optical fiber laser, and in particular a Yb-doped optical fiber is broadly used as the amplification optical fiber for high power output since conversion efficiency of Yb is high among the doped rare earths. Yb is pumped by using pumping light as with the other rare earth elements. Meanwhile, the pumping light that could not be absorbed in the amplification optical fiber is emitted from the other end of the amplification optical fiber.

As the configuration of a optical fiber laser, for example, when a resonator structure using a Fiber Bragg Grating (FBG) or a reflective mirror on either end, pulse modulation is performed by disposing an optical switch or an Acoustic Optical Modulator (AOM) in the resonator. Moreover, the MOPA (Master Oscillator Power Amplifier)-type optical fiber laser as described in Japanese Patent Application Laid-Open No. 2007-042981 performs pulse modulation by directly or externally modulating the seed light source (light-emitting device) for outputting the light to be amplified, and obtains a high power output beam by amplifying the obtained light pulse.

SUMMARY OF THE INVENTION

The present inventors have examined a conventional laser apparatus, and as a result, have discovered the following problems. Namely, in laser processing using a conventional laser apparatus, in order to realize the supply of laser beams from plural beam emitting ends as laser beam output ports, the following two methods are adopted; namely, a first method of arranging several sub laser apparatuses each having one beam emitting end as a laser beam output port, and a second method of preparing plural beam emitting ends as laser beam output ports, and supplying branch laser beams to the respective beam emitting ends, by separating the processing laser beam, which is obtained by amplifying it with the final-stage optical amplifier, with an optical element such as a mirror.

Nevertheless, in the foregoing first method, when performing processing with a pulsed laser beam, there is a possibility that the phase difference of the laser beams (light pulse trains) respectively outputted may occur and increase, between the plural sub laser apparatuses constituting the laser apparatus, in particular between the beam emitting ends of the respective sub laser apparatuses. A phase difference of light pulse is caused by the pulse operation of the respective sub laser apparatuses themselves which function as an oscillator. Additionally, in a laser apparatus that is constituted by arranging plural sub laser apparatuses, the occupied space thereof will increase. Moreover, the number of devices will increase and the power consumption will also increase in accordance with the number of output ports. Meanwhile, in the foregoing second method, since the processing laser beam is separated immediately before reaching the laser beam output port, it is necessary to considerably strengthen the laser beam power before branching in advance with the final-stage optical amplifier, and the fiber may become damaged or the output may decrease due to the nonlinear phenomenon.

The present invention was devised in order to resolve the foregoing problems. Thus, an object of the present invention is to provide a laser apparatus comprising a structure capable of supplying laser beams from the plural beam emitting ends each constituting the laser beam output port, and an overall structure capable of resolving issues concerning the enlargement of the device and low power consumption, and the issue of achieving high power with the final-stage optical amplifiers.

In order to achieve the foregoing object, the laser apparatus according to the present invention comprises a light-emitting device, an optical branching device, plural final-stage optical amplifiers, and plural beam emitting ends. The light-emitting device outputs light to be amplified with a predetermined wavelength. The optical branching device inputs the light to be amplified and separates the inputted light into plural beams. As a result of the optical branching device being disposed between the light-emitting device and the plural beam emitting ends, a multi-branched light path is constituted between the light-emitting device and the plural beam emitting ends. The plural final-stage optical amplifiers respectively correspond to the branch lines of the optical branching device, and individually amplify the beams (branch beams) that were separated by the optical branching device. Thus, the plural final-stage optical amplifiers are respectively disposed on corresponding light paths (branch lines) between the optical branching device and the plural beam emitting ends. The plural beam emitting ends correspond one-on-one to the plural final-stage optical amplifiers, and respectively output the amplified beams each being amplified by the associated final-stage optical amplifier. Note that the wavelength of the light to be amplified that enters the respective optical amplifiers is basically the same.

As described above, in accordance with the laser apparatus of the present invention, plural final-stage optical amplifiers, each corresponding to one of the plural beam emitting ends, are disposed between the optical branching device and the plural beam emitting ends. In this configuration, since it is not necessary to excessively increase the power of the light to be amplified before branching, the generation of the nonlinear phenomenon of the optical fiber before the optical branching device can be inhibited. Moreover, since the upstream side of the optical branching device; specifically, since the light-emitting device-side to be subject to pulse modulation is common, the phase difference of light pulse at the respective beam emitting ends can be reduced by that much.

However, when the output light power in the respective beam emitting ends is to be further increased, there may be cases where the increase in the output of the light-emitting device will be insufficient. In such a case, the laser apparatus according to the present invention may further comprise an intermediate optical amplifier disposed on the light path between the light-emitting device and the optical branching device.

In the laser apparatus according to the present invention having the foregoing structure, preferably, the respective light path lengths from the light-emitting device to the plural beam emitting ends are set so that the difference between the maximum light path length and the minimum light path length is 1 m or less. This configuration is preferably for reducing the phase difference of light pulse that is outputted from the plural beam emitting ends.

As various configurations that may be applied to the laser apparatus according to the present invention, a first light path length adjusting optical fiber may be disposed on each of branch lines between the optical branching device and the plural final-stage optical amplifiers. Moreover, the respective amplifying mediums of the intermediate optical amplifier and the plural final-stage optical amplifiers may be a Yb element-doped optical fiber. In the configuration of disposing the intermediate optical amplifier on the light path between the light-emitting device and the optical branching device, the laser apparatus may further comprise a second light path length adjusting optical fiber disposed between the intermediate optical amplifier and the optical branching device in order to reduce the influence of the stimulated Raman scattering (SRS). Preferably, the length of the second light path length adjusting optical fiber is set within a range where there are no problems with the SRS threshold. Similar to the delivery optical fiber, since high power light is also inputted into the second light path length adjusting optical fiber, in this case, the adjustment of the length of the second light path length adjusting optical fiber is important (when the length is long, SRS may become a problem).

In a configuration where the intermediate optical amplifier is disposed on the upstream side of the optical branching device, and plural final-stage optical amplifiers are disposed on the downstream side of the optical branching device, the plural final-stage optical amplifiers are not constantly performing the amplifying operation. Particularly, while the laser apparatus is operating, there is a group of valid final-stage optical amplifiers that are performing the amplifying operation (namely, group of the final-stage optical amplifiers which are inputted with the branch beams, as the light to be amplified, separated by and outputted from the optical branching device), and a group of invalid final-stage optical amplifiers that are not performing the amplifying operation (namely, group of the final-stage optical amplifiers which are not inputted with the branch beams), and the ratio thereof may change. Accordingly, it is preferable that, regardless of the variation in the number of valid final-stage optical amplifiers (final-stage optical amplifiers performing the amplifying operation) belonging to the plural final-stage optical amplifiers and inputting the plural branch beams, each power of the branch beams that are inputted to the valid final-stage optical amplifiers is constant. Thus, the laser apparatus according to the present invention preferably comprises power setting means for setting the power of the light to be amplified, that is outputted from the light-emitting device or the intermediate optical amplifier, according to the number of valid final-stage optical amplifiers that are performing the amplifying operation.

In the laser apparatus according to the present invention, amplification optical fibers, used in at least two or more final-stage optical amplifiers among the plural final-stage optical amplifiers, may have different mode field diameters (MFDs) so that the output light powers do not coincide. By this, each of the amplification optical fibers is set to output light power according to the MFD. In this case, the processing output light of the intended power can be obtained for each beam emitting end.

The laser beam source according to the present invention may also have a configuration where the light source including the light-emitting device and the optical branching device are optically connected without going through an optical amplifier. In this case, the laser apparatus according to the present invention comprises a light source, an optical branching device, plural final-stage optical amplifiers, plural beam emitting ends, plural first light path length adjusting optical fibers, and plural delivery optical fibers. The light source outputs light to be amplified. The optical branching device is an optical component for separating the light to be amplified that was outputted from the light source, and constitutes a multi-branched light path between the light source and the plural beam emitting ends. The plural final-stage optical amplifiers are provided in correspondence with plural branch lines positioned between the optical branching device and the plural beam emitting ends, and respectively amplify the associated branch beam from the optical branching device. The plural beam emitting ends are provided so as to correspond one-on-one to the plural final-stage optical amplifiers, and respectively output the amplified beams each being amplified by the associated final-stage optical amplifier. In the foregoing configuration, the plural first light path length adjusting optical fibers are respectively disposed on the branch lines between the optical branching device and the plural final-stage optical amplifiers. Moreover, the plural delivery optical fibers are respectively disposed so as to connect the plural final-stage optical amplifiers and the plural beam emitting ends one-on-one.

As described above, in a configuration where the light source and the optical branching device are optically connected without going through the optical amplifier, the light source may include a light-emitting device for outputting light to be amplified, and a second light path length adjusting optical fiber for guiding the light to be amplified outputted from the light-emitting device to the optical branching device. Note that, when the number of valid final-stage optical amplifiers performing the amplifying operation will increase among the plural final-stage optical amplifiers provided so as to correspond one-on-one to the branch lines of the optical branching device, the light source may include, as the intermediate optical amplifier, a different optical amplifier provided between the light-emitting device and the second light path length adjusting optical fiber.

BRIEF DESCRIPTION OF THE DRAWINGS

FIGS. 1A and 1B are views showing the configuration of the laser apparatus (optical fiber laser) according to the first comparative example;

DESCRIPTION OF THE PREFERRED EMBODIMENTS

Figure 2A:
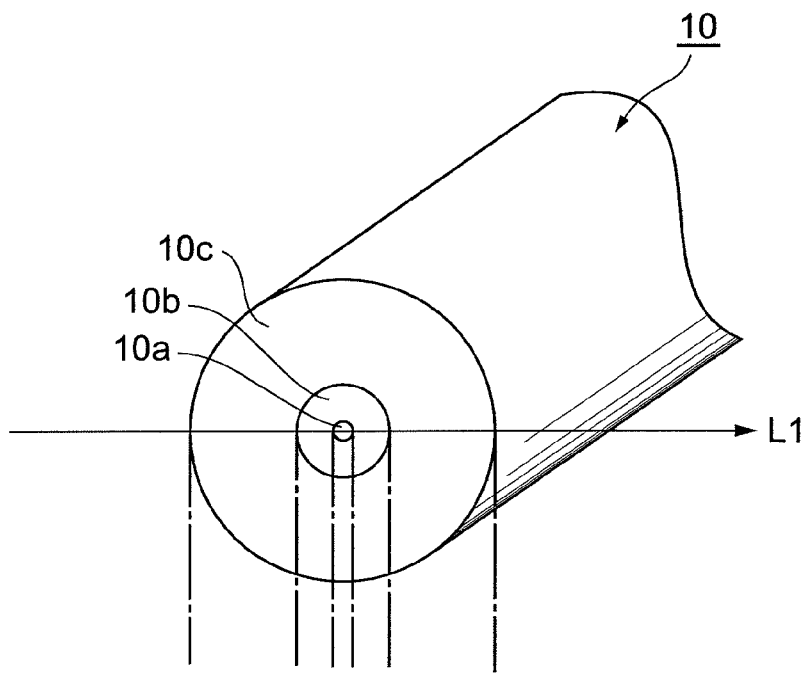
FIGS. 2A and 2B are views showing the cross section structure of the amplification optical fiber and the refractive index profile thereof.

In the following, embodiments of the laser apparatus according to the present invention are now explained in detail with reference to FIGS. 1A to 2B, 3, 4A and 4B, 5 to 11, 12A to 12C, and 13 to 16. In the description of the drawings, identical or corresponding components are designated by the same reference numerals, and overlapping description is omitted.

In the ensuing explanation, after explaining the comparative examples to be compared with the present embodiments, the present embodiments and the modified examples thereof are explained in comparison with the comparative examples.

First Comparative Example

FIGS. 1A and 1B show the configuration of the laser apparatus (optical fiber laser) according to the first comparative example including some basic constituent elements of the laser apparatus according to the present invention, and specifically show the configuration of a MOPA-type optical fiber laser. Namely, the optical fiber laser 100 according to the first comparative example comprises a structure of an optical fiber laser including a single beam emitting end serving as a laser beam output port. In FIG. 1A, the optical fiber laser 100 according to the first comparative example comprises a seed light source 41 as a light-emitting device, a modulator 51, an intermediate optical amplifier AMP0, a final-stage optical amplifier AMP1, a delivery optical fiber 11, and a beam emitting end 70. The final-stage optical amplifier AMP1 comprises an amplification optical fiber 10, a combiner 20, a pumping light source 31 and an optical fiber 32. Moreover, the intermediate optical amplifier AMP0 basically comprises the same structure as the final-stage optical amplifier AWL and has an amplification optical fiber 61. As shown in FIG. 1A, the seed light source 41 is connected to the modulator 51 via the electrical signal line 52, and a seed light pulses (pulsed laser beam as the light to be amplified) are repeatedly generated by performing direct modulation to the seed light source 41 according to a predetermined basic pulse modulation pattern built in the modulator 51. Note that the operation for setting the basic pulse modulation pattern in the modulator 51 may be performed manually or via an external trigger signal line. In this specification, the symbol "×" shown in the respective drawings shows the connections and, for example, shows the fiber fusion splicing points in the case of connecting the optical fibers via fiber fusion splicing.

In the optical fiber laser 100, the pumping light from the pumping light source 31 that passed through the optical fiber 32 and the seed light pulse from the seed light source 41 that passed through the optical fiber 42 and the optical isolator 61 are combined by the combiner 20. The combined light from the combiner 20 enters one end of the amplification optical fiber 10. Note that the pumping light source 31 may also be constituted, as shown in FIG. 1B, by plural laser diodes (LD1 to LD6) (number may be decided as needed) for supplying pumping light of a predetermined wavelength to the amplification optical fiber 10 via the combiner 20.

The seed light pulses are amplified as a result of the rare earth elements (Yb, Er, Tm, Ho, Nd, Pr, Tb and the like) doped to the amplification optical fiber 10 being pumped with the pumping light in the amplification optical fiber 10 in which the combined pumping light and seed light pulses are propagating. The seed light pulses amplified in the amplification optical fiber 10 pass through the delivery optical fiber 11 that is fusion-spliced with the other end of the amplification optical fiber 10, and thereafter outputted from the beam emitting end 70 to the outside.

Figure 2B:
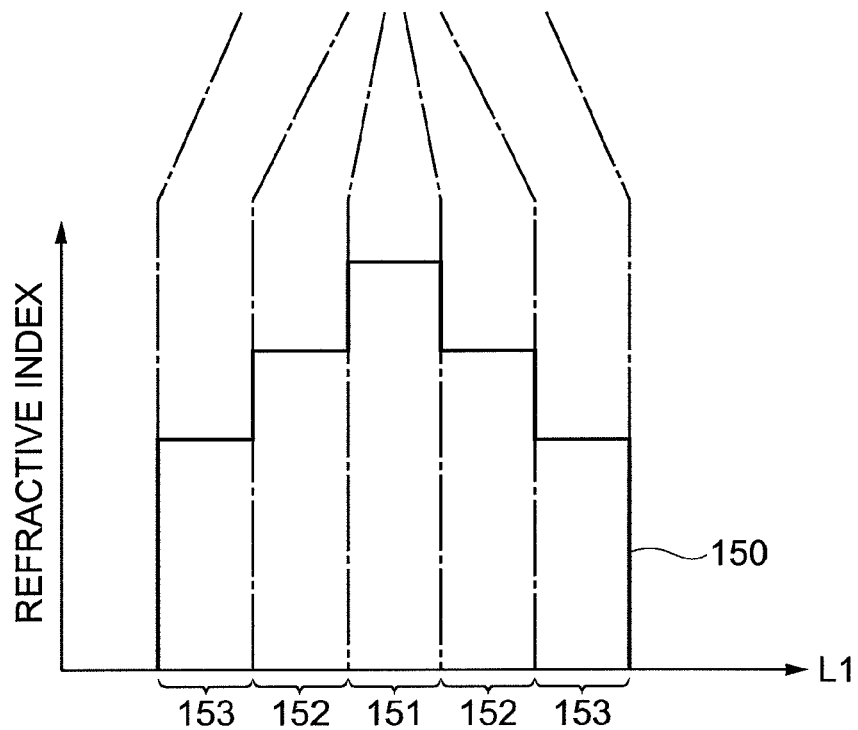

For example, the amplification optical fiber 10 has a cross section structure and a refractive index profile as shown in FIGS. 2A and 2B. Namely, the amplification optical fiber 10 comprises, as shown in FIG. 2A, a core 10a having a predetermined refractive index and extending along a predetermined axis, a first cladding 10b having a lower refractive index than the core 10a and provided on the outer periphery of the core 10a, and a second cladding 10c having a lower refractive index than the first cladding 10b and provided on the outer periphery of the first cladding 10b. FIG. 2B shows the refractive index profile 150 along the diametric direction L1 of the amplification optical fiber 10 (direction that is orthogonal to the optical axis of the amplification optical fiber 10). The area 151 shows the refractive index along the diametric direction L1 of the core 10a, the area 152 shows the refractive index along the diametric direction L1 of the first cladding 10b, and the area 153 shows the refractive index along the diametric direction L1 of the second cladding 153.

The core 10a, the first cladding 10b, and the second cladding 10c constitute a double cladding structure. The core 10a propagates the seed light pulses in a single mode, and the first cladding 10b propagates the pumping light in a multi mode. The core 10a is doped with Yb as the rare earth element, and the seed light pulses are amplified in the core 10a.

Figure 3:
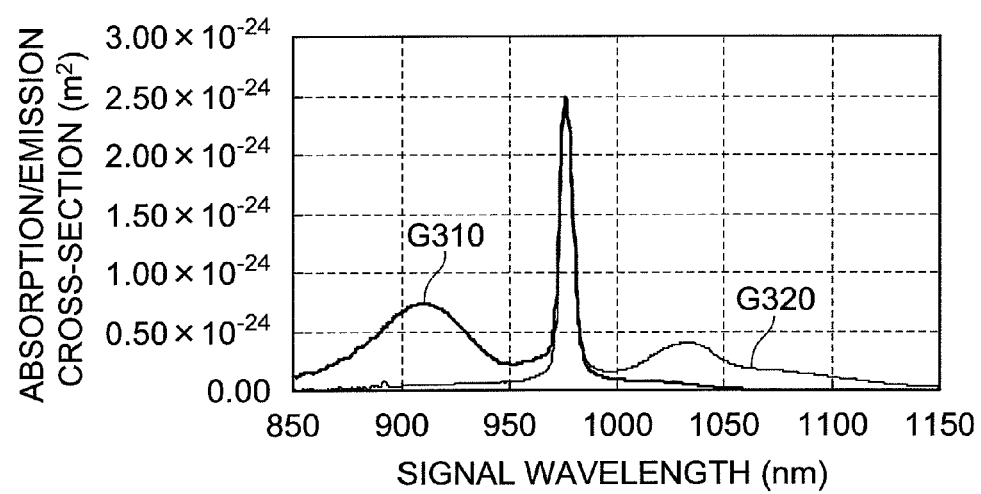
FIG. 3 is a graph showing the respective wavelength dependencies of the absorption cross-section and the emission cross-section of the amplification optical fiber.

The pumping light absorption in the amplification optical fiber 10 is decided based on the characteristics of the amplification optical fiber 10, and primarily changes based on the mode field diameter (MFD), outer diameter of the first cladding 10b, and adjustment of the rare earth-doped concentration in the core 10a. FIG. 3 shows the respective wavelength dependencies of the absorption cross-section and the emission cross-section of the Yb-doped optical fiber. The curve G310 shows the absorption cross-section, and the curve G320 shows the emission cross-section. In the Yb-doped optical fiber (corresponds to the amplification optical fiber 10), the Yb-doped amount is 10000 ppm, the MFD is 7 μm, the outer diameter of the first cladding 10b is 130 μm, the length is 5 m, and the pumping light of approximately 2.4 dB is absorbed in a wavelength band of an pumping wavelength of 915 nm. Note that the wavelength band of the pumping light may also be a 940 nm band or a 975 nm band, and will differ depending on the type of the rare earth element to be doped.

The pumping light source 31 may be constituted by a single laser diode as described above, or, as shown in FIG. 1B, from plural laser diodes LD1 to LD6. The wavelength of the pumping light that is outputted from the pumping light source 31 is a 915 nm band, a 940 nm band or a 975 nm band. The seed light source 41 is, for example, a light-emitting device such as an LD or a VCSEL. The modulator 51 performs direct modulation (pulse modulation) to the seed light source 41 by applying a driving electrical signal to the seed light source 41 via the electrical signal line 52. The wavelength of the seed light pulses outputted from the seed light source 41 is within the wavelength range of 1030 nm to 1130 nm, and, for example, is 1060 nm. Note that the pulse modulation may also be an external modulation.

Figure 4A:
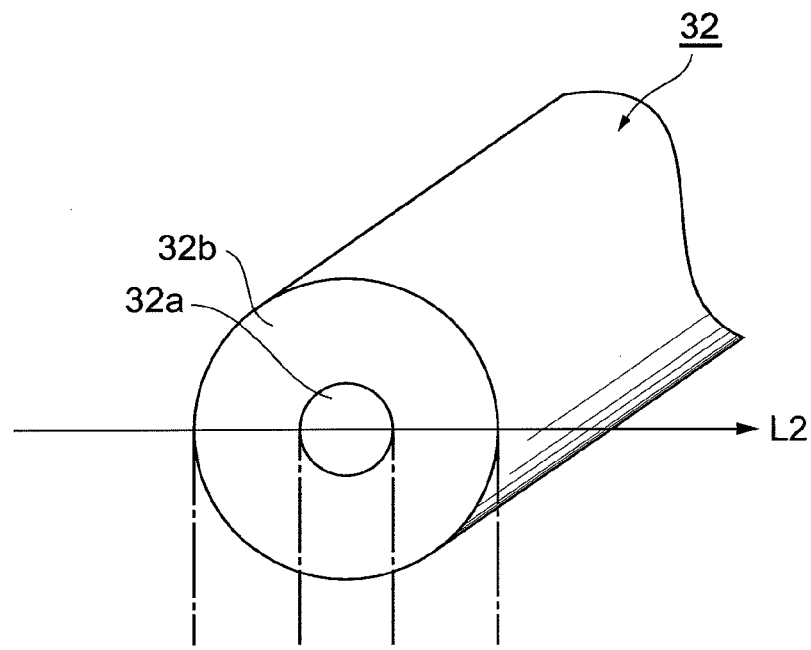
FIGS. 4A and 4B are views showing the cross section structure of the delivery optical fiber and the refractive index profile thereof.
Figure 4B:
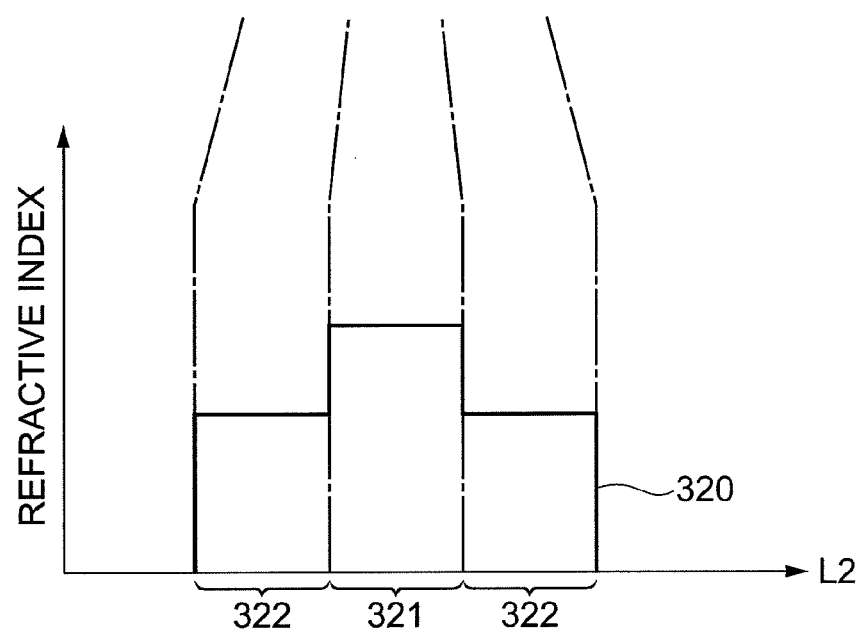

The optical fiber 32 and the delivery optical fiber 11 provided between the pumping light source 31 and the combiner 20 respectively have the cross section structure and the refractive index profile as shown in FIG. 4. Note that FIGS. 4A and 4B show the cross section structure and the refractive index profile of the optical fiber 32, but the delivery optical fiber 11 also has the same cross section structure and the refractive index profile. Namely, as shown in FIG. 4A, the optical fibers 32 and 11 comprise a core 32a having a predetermined refractive index and extending along a predetermined axis, and a cladding 32b having a lower refractive index than the core 32a and provide on the outer periphery of the core 32a. Moreover, FIG. 4B is the refractive index profile 320 along the diametric direction L2 of the optical fiber 32 (direction that is orthogonal to the optical axis of the optical fiber 32), and the area 321 shows the refractive index along the diametric direction L2 of the core 32a, and the area 322 shows the refractive index along the diametric direction L2 of the cladding 32b. Note that the core 32a propagates the pumping light outputted from the pumping light source 31 in a multi mode.

Figure 5:
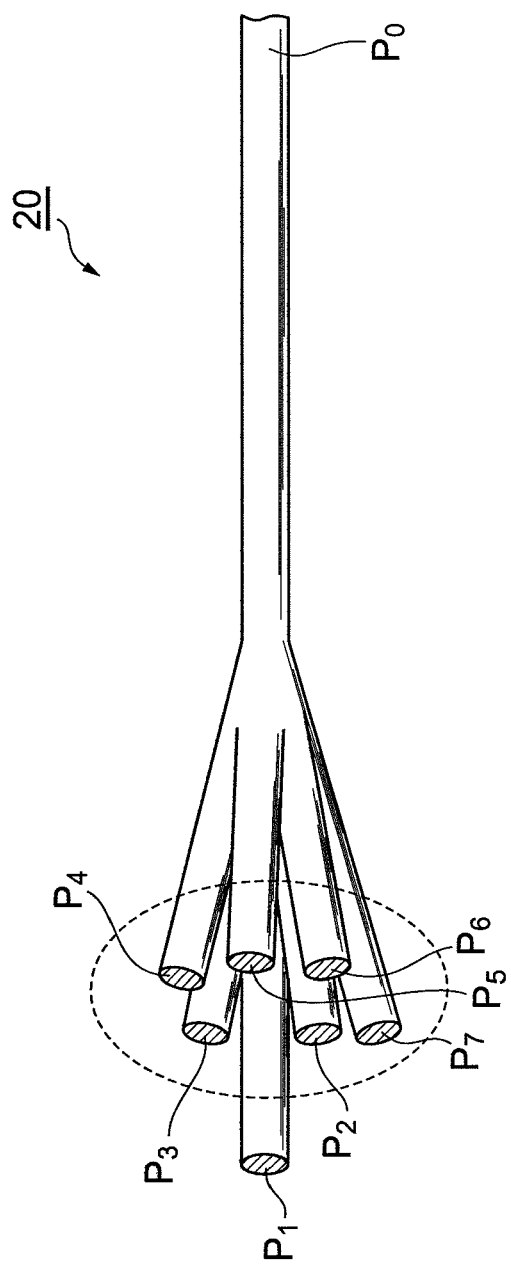
FIG. 5 is a view for explaining the configuration of the combiner.

FIG. 5 shows the configuration of the combiner 20. The combiner 20 shown in FIG. 5 has plural (seven in the example of FIG. 5) beam input/output ports $P_1$ to $P_7$ on one side, and has a common port $P_0$ on the other side. The combiner 20 combines the beams inputted into the beam input/output ports $P_1$ to $P_7$, and outputs the combined beam to the common port $P_0$. Contrarily, the combiner 20 separates the beam inputted into the common port $P_0$, and outputs the separated beams from the beam input/output ports $P_1$ to $P_7$, respectively.

The optical fiber on the common port $P_0$ side of the combiner 20 has the same double cladding structure as the amplification optical fiber 10, and is connected to the amplification optical fiber 10. The beam input/output port $P_1$ is optically connected to the seed light source 41 via the optical fiber 42. The beam input/output port $P_2$ is optically connected to the pumping light source 31 via the optical fiber 32. Note that, although only one input port of the pumping light from the pumping light source 31 is shown in FIG. 1A, as shown in FIG. 1B, the other beam input/output ports $P_3$ to $P_7$ may also be optically connected to the other pumping light sources LD1 to LD6 via another optical fiber.

Second and Third Comparative Examples

When preparing two beam emitting ends as the laser output port and supplying a laser beam of 5 W from each of the beam emitting ends, considered may be a configuration (second comparative example) of preparing two optical fiber lasers each having the same structure as the optical fiber laser 100 shown in FIG. 1A, and outputting 5 W laser beams from the respective optical fiber lasers, and a configuration (third comparative example) of respectively separating a 10 W laser beam into two beams on the laser beam output port side, and outputting 5 W laser beams from the two beam emitting ends. Note that FIG. 6 is a view showing the configuration of the laser apparatus (optical fiber laser) according to the second comparative example, and FIG. 7 is a view showing the configuration of the laser apparatus (optical fiber laser) according to the third comparative example.

Figure 6:
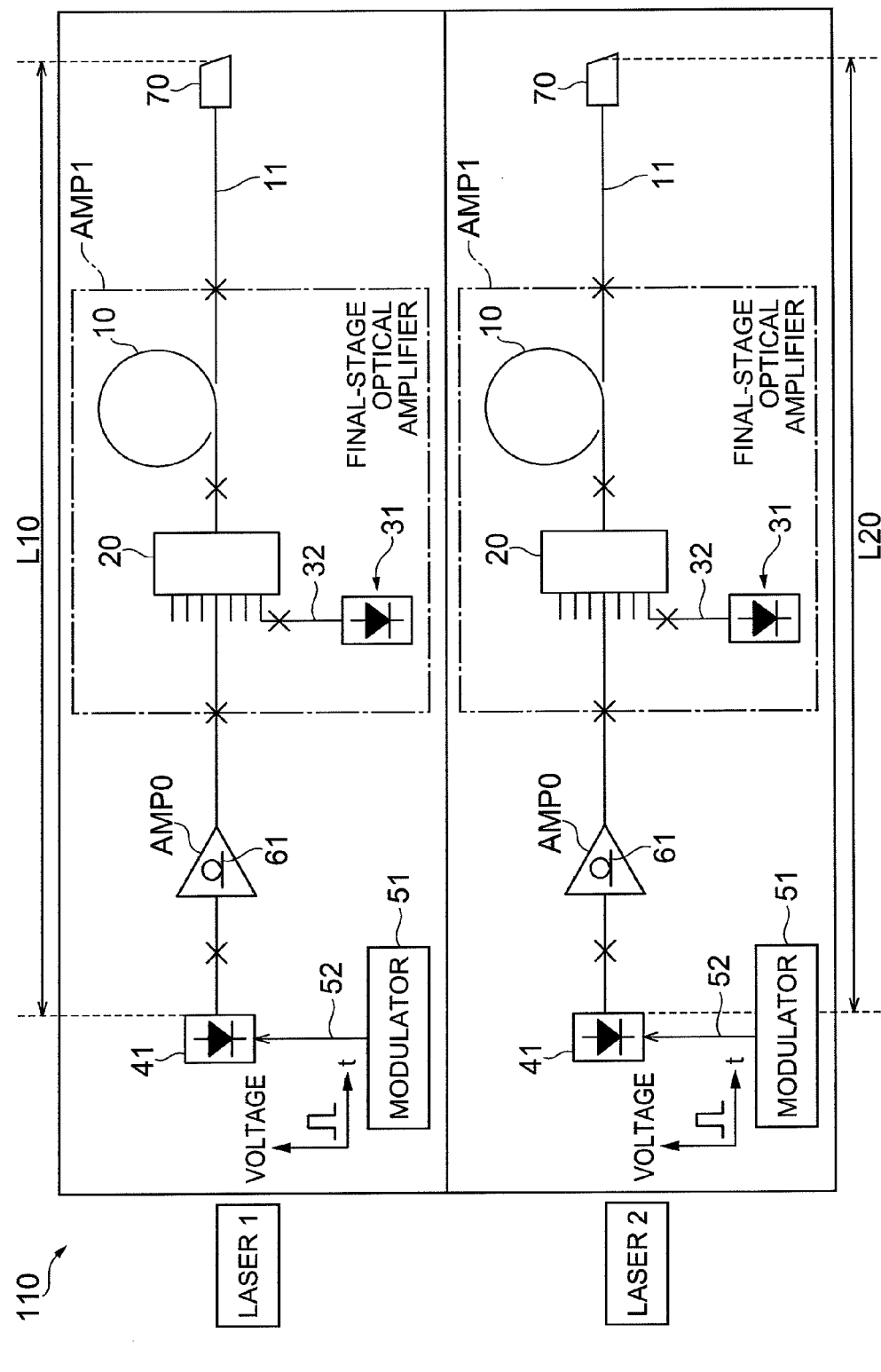
FIG. 6 is a view showing the configuration of the laser apparatus (optical fiber laser) according to the second comparative example.

As shown in FIG. 6, the optical fiber laser 110 according to the second comparative example is constituted, as a sub laser apparatus, by laser 1 and a laser 2, which respectively have the same structure as the optical fiber laser 100 of FIG. 1A, being disposed in parallel. Moreover, the laser 1 has a light path length L10, and the laser 2 has a light path length L20. In both the laser 1 and the laser 2, the light path length is defined based on the distance from the emitting end surface of the seed light pulse in the seed light source 41 to the emitting end surface in the beam emitting end 70 (in reality, from the fiber length from the seed light source 41 to the beam emitting end 70).

Figure 7:
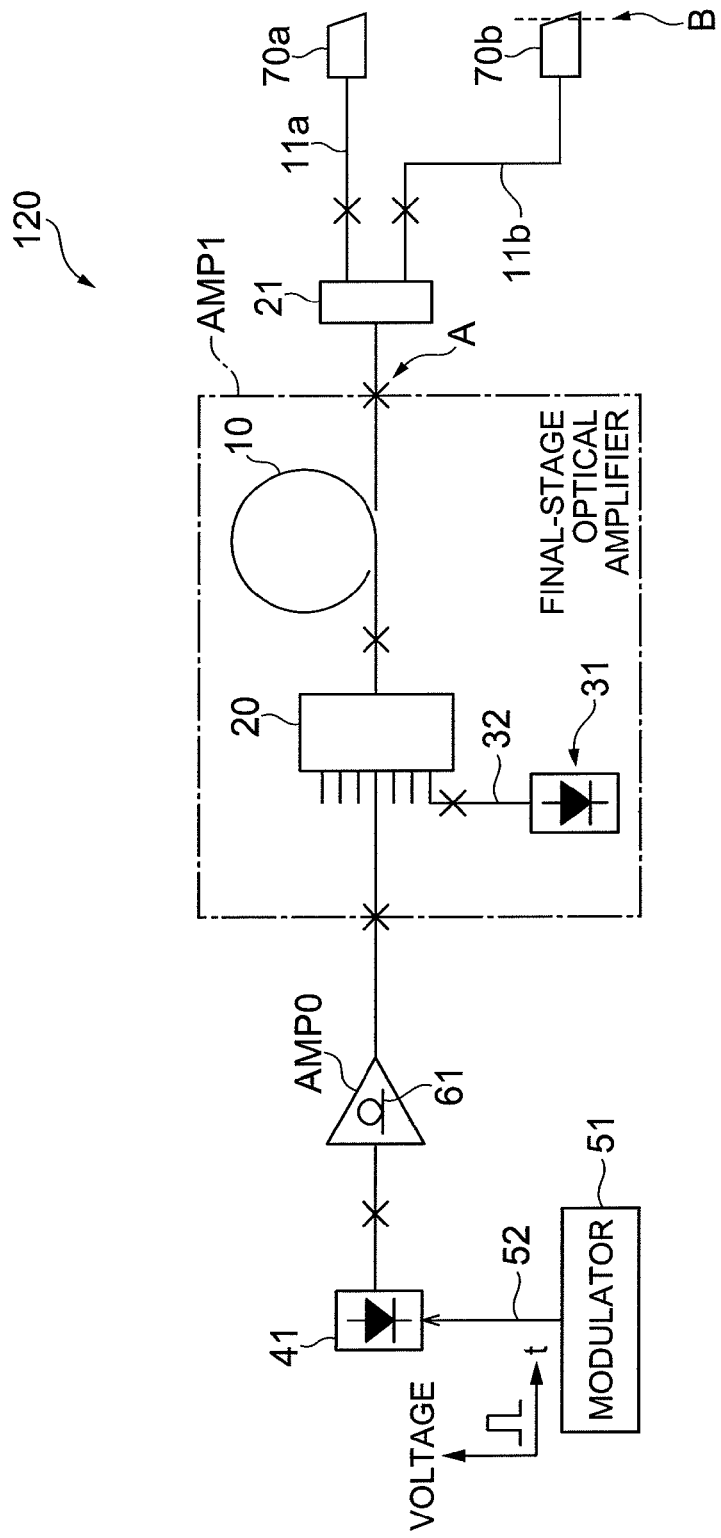
FIG. 7 is a view showing the configuration of the laser apparatus (optical fiber laser) according to the third comparative example.

The optical fiber laser 120 according to the third comparative example has the same structure as the optical fiber laser 100 of FIG. 1A excluding the structure on the laser beam output port side as shown in FIG. 7. Namely, in the optical fiber laser 120 according to the third comparative example, the laser beam output port is constituted by an optical coupler 21 for separating the laser beam (processing laser beam) outputted from the final-stage optical amplifier AMP1, two beam emitting ends 70a, 70b, and delivery optical fibers 11a, 11b for optically connecting the optical coupler 21 and each of the two beam emitting ends 70a, 70b.

Figure 8:
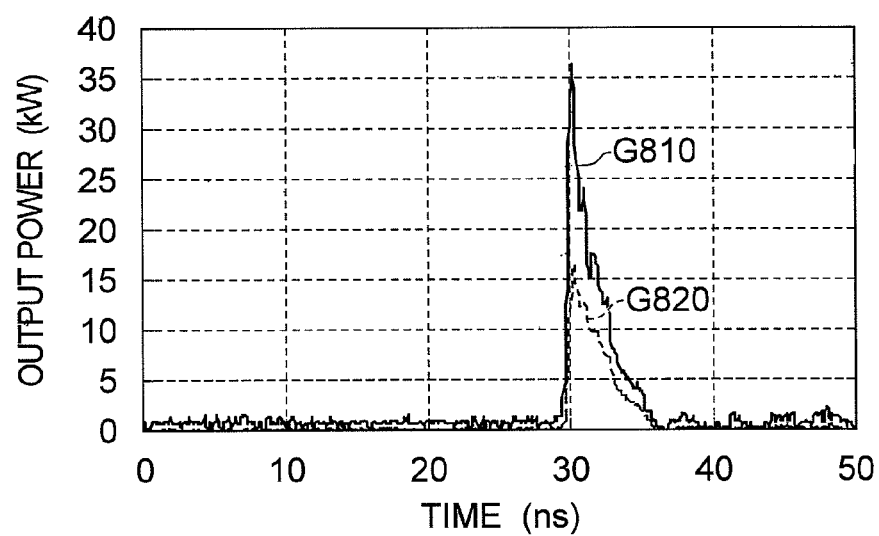
FIG. 8 shows the respective amplification characteristics of a seed light pulse with an average output of 5 W and a seed light pulse with an average output of 10 W according to the first comparative example.

FIG. 8 shows the respective amplification characteristics of the seed light pulse with an average output of 5 W and the seed light pulse with an average output of 10 W upon repeatedly performing pulse modulation at a pulse width of 5 ns and a frequency of 100 kHz in the optical fiber laser 100 of FIG. 1A. In FIG. 8, the curve G810 shows the amplification characteristics of the seed light pulse with an average output of 10 W, and has a pulse peak of approximately 35 kW. Meanwhile, the curve G810 shows the amplification characteristics of the seed light pulse with an average output of 5 W, and has a pulse peak of approximately 17 kW. Regarding the amplification characteristics of both seed light pulses of with an average output of 10 W and 5 W, it is evident that the pulse peaks are basically the same.

Figure 9:
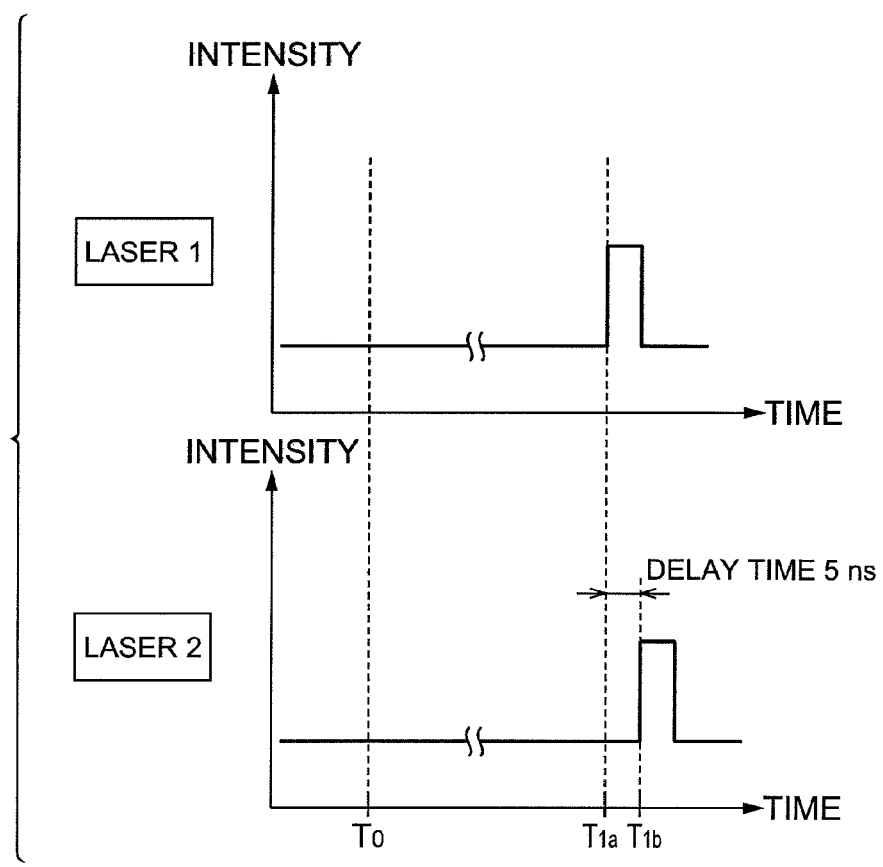
FIG. 9 is a view for explaining the phase difference of light pulse that arises in the laser apparatus according to the second comparative example.

In the optical fiber laser 110 (FIG. 6) according to the second comparative example, since the laser 1 and the laser 2 having the same structure are disposed in parallel, the installation space will be more than twice of the optical fiber laser 100. Moreover, the difference of the light path length L10 and the light path length L20 and the phase difference in the modulator 51 that pulses the laser beam as the seed light pulse will induce influence between the laser 1 and the laser 2. Thus, a phase difference of light pulse may occur between the beam emitting end 70 of the laser 1 and the beam emitting end 70 of the laser 2, and the positional precision during the processing will deviate considerably. For example, when the difference between the light path length L10 of the laser 1 and the light path length L20 of the laser 2 is 1 m, as shown in FIG. 9, a propagation delay (delay difference) of 5 ns will arise in the output light pulses, and a phase difference of light pulse will occur between the beam emitting end of the laser 1 and the beam emitting end 70 of the laser 2. Note that FIG. 9 is a view for explaining the phase difference of light pulse that arises in the optical fiber laser 110 according to the second comparative example.

Figure 10:
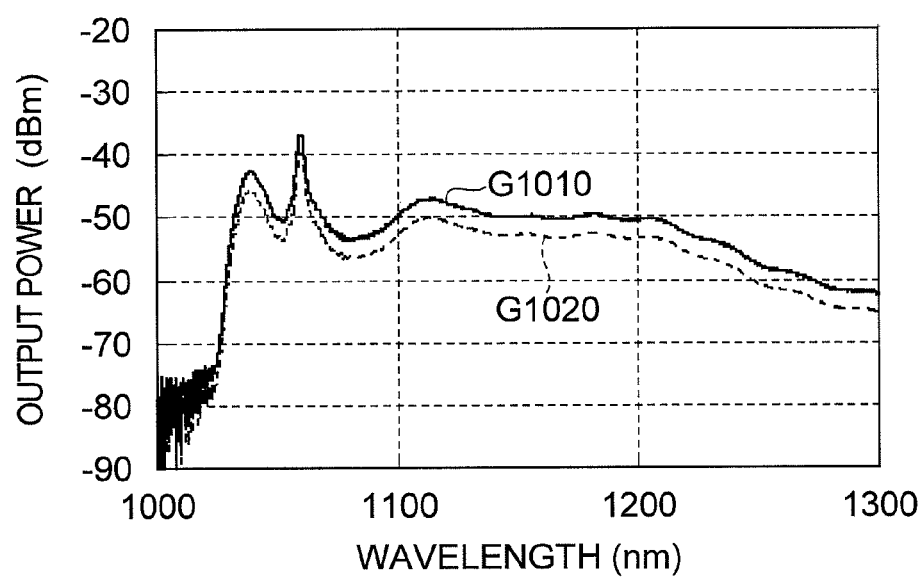
FIG. 10 is a spectrum of the pulsed laser beam in the respective parts of the laser apparatus according to the third comparative example.

In the optical fiber laser 120 (FIG. 7) according to the third comparative example, the foregoing phase difference of light pulse between the beam emitting end 70 of the laser 1 and the beam emitting end 70 of the laser 2 is alleviated. Nevertheless, as the overall device, the optical fiber laser 120 according to the third comparative example may induce an increase in the power consumption. Moreover, upon pulsing a laser beam with an average output of 15 W, a nonlinear phenomenon may be considerably expressed, and it may not be possible to obtain a predetermined pulse peak. The nonlinear phenomenon that occurs in the respective parts (portions respectively shown with arrow A and arrow B in FIG. 7) to which the seed light pulse with an average output of 15 W is propagated will propagate to the respective parts in the optical fiber laser 120 as shown in FIG. 10. Thus, in the optical fiber laser 120 according to the third comparative example, the lens chromatic aberration and wavelength loss characteristics caused by the nonlinear phenomenon will become problematic. Note that FIG. 10 is a spectrum of the pulsed laser beam in the respective parts of the laser apparatus according to the third comparative example. Moreover, in FIG. 10, G1010 shows the spectrum of the light pulse in the beam emitting end of the final-stage optical amplifier AMP1 shown with the arrow A in the optical fiber laser 120 (FIG. 7) according to the third comparative example, and G1020 shows the spectrum of the light pulse in the beam emitting end 70 shown with the arrow B.

First Embodiment

Figure 11:
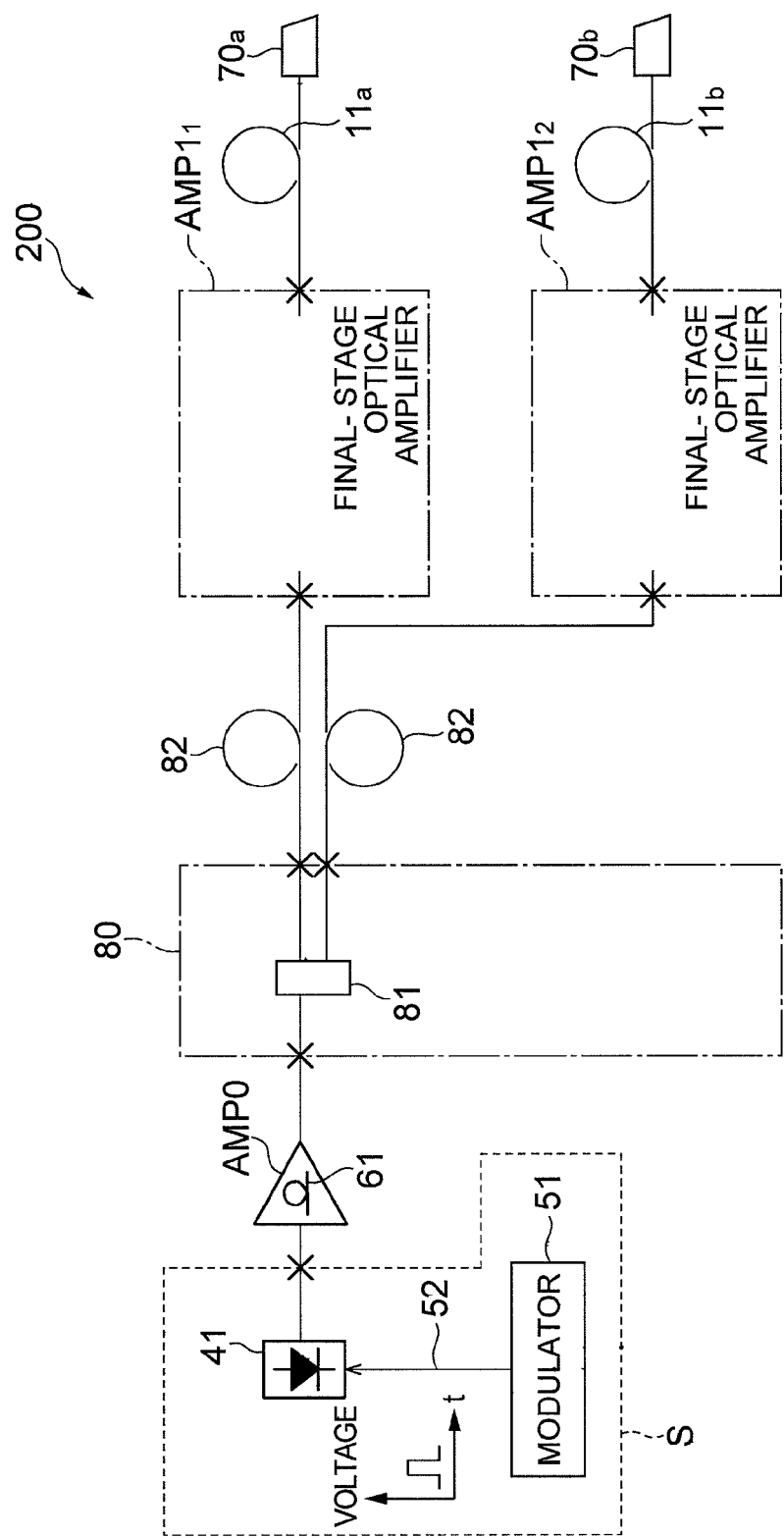
FIG. 11 is a view showing the configuration of a first embodiment of the laser apparatus (optical fiber laser) according to the present invention.

The first embodiment of the laser apparatus according to the present invention is now explained. FIG. 11 is a view showing the configuration of the optical fiber laser 200 according to the first embodiment. The optical fiber laser 200 has plural beam emitting ends serving as a laser beam output port, and comprises plural final-stage optical amplifiers corresponding one-on-one with each of the beam emitting ends. Namely, in FIG. 11, the optical fiber laser 200 according to the first embodiment comprises a seed light source 41 as a light-emitting device, a modulator 51, an intermediate optical amplifier AMP0, an optical branching device 80, first light path length adjusting optical fibers 82, final-stage optical amplifiers $AMP1_1$, $AMP1_2$, delivery optical fibers 11a, 11b, and beam emitting ends 70a, 70b. Note that the intermediate optical amplifier may be constituted by plural stages when the amplification power is insufficient with a single stage.

The foregoing seed light source 41, the modulator 51, and the intermediate optical amplifier AMP0 have the same structures as those of the optical fiber laser 100 of FIG. 1A. Namely, in the optical fiber laser 200 according to the first embodiment, the intermediate optical amplifier AMP0 also comprises an amplification optical fiber 61. Moreover, similar to the optical fiber laser 100 of FIG. 1A, the seed light source 41 is connected to the modulator 51 via the electrical signal line 52, and seed light pulses (pulsed laser beam as the light to be amplified) are repeatedly generated by performing direct modulation to the seed light source 41 according to a predetermined basic pulse modulation pattern built in the modulator 51. The operation for setting the basic pulse modulation pattern in the modulator 51 may be performed manually or via an external trigger signal line. Accordingly, in the first embodiment, the seed light source 41 and the intermediate optical amplifier AMP0 have the same structures as those in the optical fiber laser 100 of FIG. 1A, and the final-stage optical amplifiers $AMP1_1$, $AMP1_2$ are prepared in accordance with the required number of beam emitting ends 70a, 70b. Note that, in the first embodiment, the seed light pulse train from the intermediate optical amplifier AMP0 are separated by the optical branching device 80, and each of the separated seed light pulse trains (branch beams) is supplied to the respective final-stage optical amplifiers $AMP1_1$, $AMP1_2$ via the first light path length adjusting optical fibers 82. The output power in the optical fiber laser 200 is 5 W per one beam emitting end. Moreover, in the first embodiment, a light source S is constituted by the seed light source 41 and the modulator 51.

The constituent elements (first light path length adjusting optical fiber 82, final-stage optical amplifier $AMP1_1$, delivery optical fiber 11a, beam emitting end 70a) of one branch line positioned on the downstream side of the optical branching device 80, and the constituent elements (first light path length adjusting optical fiber 82, final-stage optical amplifier $AMP1_2$, delivery optical fiber 11b, beam emitting end 70b) of the other branch line also have the same structure as the final-stage optical amplifier AMP1, the delivery optical fiber 11, and the beam emitting end 70 in the optical fiber laser 100 of FIG. 1A, excluding the first light path length adjusting optical fiber 82. Each of the first light path length adjusting optical fibers 82 has the same structure as the delivery optical fiber 11.

The number of beam emitting ends 70a, 70b is greater than the number of seed light sources 41. Moreover, the optical branching device 80 includes a two-branch optical coupler 81 with an input port corresponding to the seed light source 41 and output ports each corresponding to the beam emitting ends 70a, 70b in order to supply the laser beam from the light-emitting device of the seed light source 41 to each of the plural beam emitting ends 70a, 70b. The optical branching device 80 constitutes a part of the light path for optically combining the seed light source 41 and the respective beam emitting ends 70a, 70b. The final-stage optical amplifiers $AMP1_1$, $AMP1_2$ correspond to one of the beam emitting ends 70a, 70b, and are respectively disposed on the light path between the associated one of the beam emitting ends 70a, 70b and the optical branching device 80.

The respective final-stage optical amplifiers $AMP1_1$, $AMP1_2$ may comprise mutually different structures, or comprise the same structure. Note that, as the structure of the final-stage optical amplifiers $AMP1_1$, $AMP1_2$, for example, the various structures shown in FIGS. 12A to 12C may be applied.

For example, at least one of the final-stage optical amplifiers $AMP1_1$, $AMP1_2$ may have the same structure (structure for realizing the forward pumping shown in FIG. 12A) as the final-stage optical amplifier AMP1 of FIG. 1A. Namely, the final-stage optical amplifier AMP1$_n$ (n=1 to N) which realizes the forward pumping comprises an amplification optical fiber 10, a combiner 20, an pumping light source 31 and an optical fiber 32. The amplification optical fiber 10 has the cross section structure and refractive index profile 150 shown in FIGS. 2A and 2B. The combiner 20 has the structure shown in FIG. 5. The pumping light source 31 may be constituted by plural laser diodes LD1 to LD6 as shown in FIG. 1B. Moreover, the optical fiber 32 has the cross section structure and refractive index profile 320 shown in FIGS. 4A and 4B.

Figure 12A:
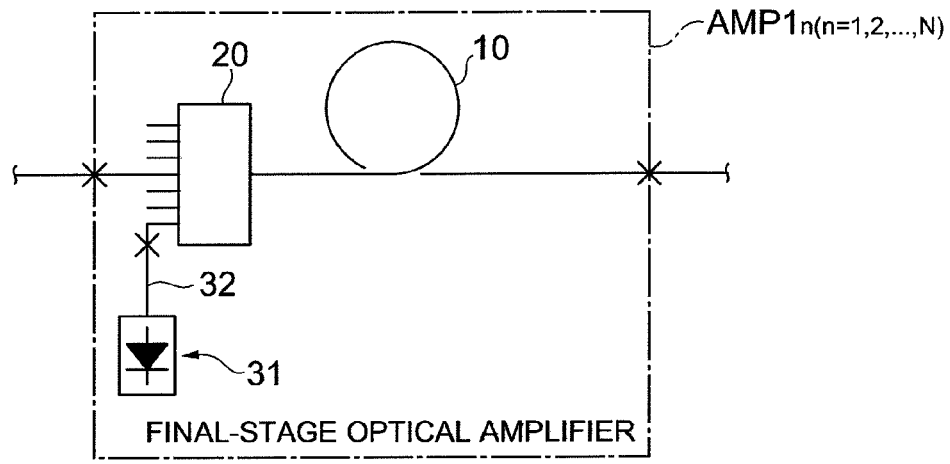
FIGS. 12A to 12C are views showing various configuration examples of the final-stage optical amplifier.
Figure 12B:
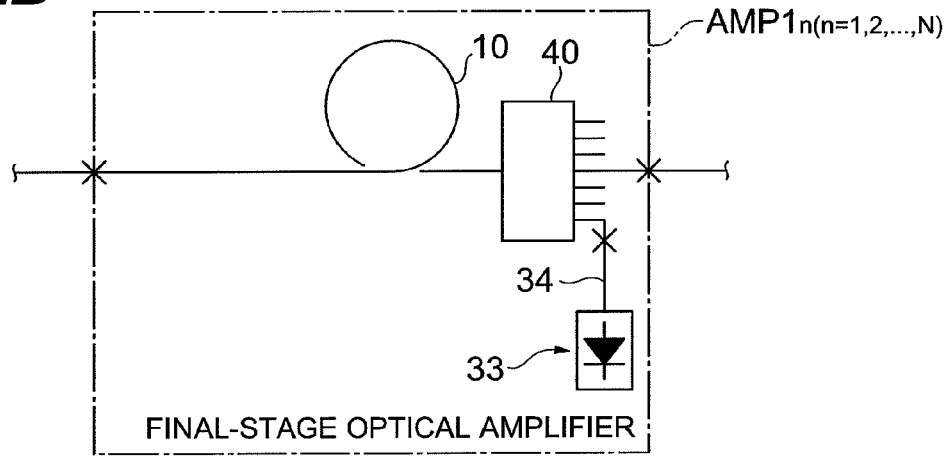

At least one of the final-stage optical amplifiers AMP1$_1$, AMP1$_2$ may comprise a structure for realizing the backward pumping shown in FIG. 12B. Namely, the final-stage optical amplifier AMP1$_n$ (n=1 to N) for realizing the backward pumping comprises an amplification optical fiber 10, a combiner 40, a pumping light source 33 and an optical fiber 34. The pumping light source 33 may be constituted by a single laser diode, or, as shown in FIG. 1B, by plural laser diodes LD1 to LD6. The combiner 40 has the structure shown in FIG. 5 similar to the combiner 20. However, in the combiner 40, the common port P$_0$ is connected to the beam emitting end of the amplification optical fiber 10, and the input/output port P$_1$ is connected to the associated delivery optical fiber. The other input/output ports P$_2$ to P$_7$ are respectively connected to the prepared pumping light source 31 (single laser diode or plural laser diodes LD1 to LD6). The optical fiber 34 has the cross section structure and refractive index profile 320 as shown in FIGS. 4A and 4B similar to the optical fiber 32.

Figure 12C:
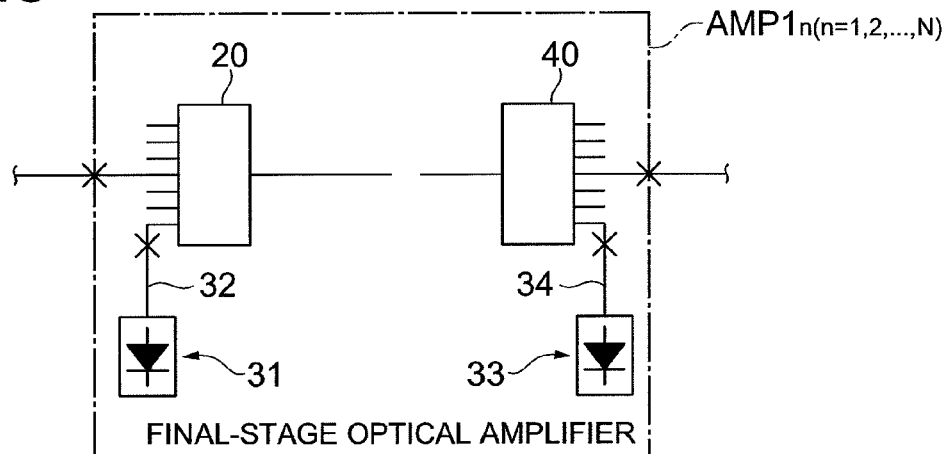

At least one of the final-stage optical amplifiers AMP1$_1$, AMP1$_2$ may comprise a structure for realizing the bidirectional pumping shown in FIG. 12C. Namely, the final-stage optical amplifier AMP1$_n$ (n=1 to N) for realizing the bidirectional pumping comprises a combiner 20, a pumping light source 31, an optical fiber 32, an amplification optical fiber 10, a combiner 40, a pumping light source 33 and an optical fiber 34. The pumping light source 31 and the pumping light source 33 respectively have the same structure as described above. The combiner 20 and the combiner 40 also respectively have the same structure. The optical fiber 32 and the optical fiber 34 also respectively have the same cross section structure and refractive index profile 320.

In accordance with the optical fiber laser 200 according to the first embodiment configured as described above, it is possible to reduce the phase difference of light pulse between the beam emitting ends 70a, 70b, suppress the power consumption, and suppress the nonlinear threshold between the beam emitting ends 70a, 70b.

The configuration of the first embodiment and the configuration of the respective comparative examples are now compared based on a configuration with the same average output and pulse peak per beam emitting end. The conventional configuration and the configuration of the present invention are now compared.

Regarding the occupied space, the optical fiber laser 110 (FIG. 6) according to the second comparative example requires an occupied space for the number of sub laser apparatuses (laser 1, laser 2) that are prepared. Meanwhile, since the occupied area will increase as the number of beam emitting ends serving as a laser beam output port increases, the occupied area of the optical fiber laser 200 according to the first embodiment will increase in comparison to the optical fiber laser 100 (FIGS. 1A and 1B) according to the first comparative example, but can be suppressed in comparison to the optical fiber laser 110 (FIG. 6) according to the second comparative example.

Regarding the power consumption, when calculating the power consumption of only one light source S (seed light source 41), the power consumption of the optical fiber laser 200 according to the first embodiment is approximately 48 W, the power consumption of the optical fiber laser 110 (FIG. 6) according to the second comparative example is approximately 47 W, and the power consumption of the optical fiber laser 120 (FIG. 7) according to the third comparative example is approximately 64 W. In the second comparative example, since the number of seed light sources increases according to the number of ports, the power consumption of the light source portion will increase. Upon comparing the first embodiment and the third comparative example with the same number of seed light sources, the power consumption of the first embodiment can be suppressed by approximately 25%. This is because, with the optical fiber laser 120 according to the third comparative example, the current of the pumping light source and the load of temperature control will increase in order to achieve high output.

Figure 13:
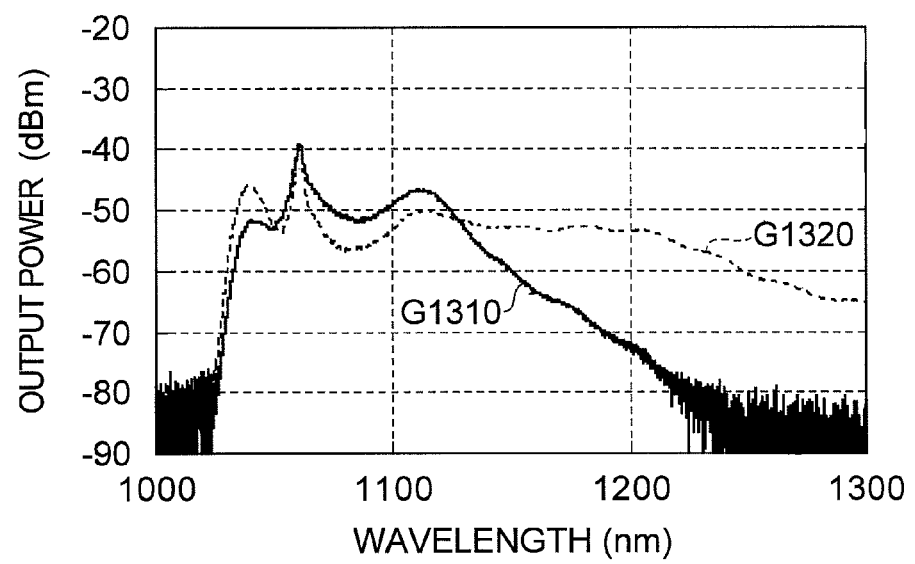
FIG. 13 is spectra of a pulsed laser beam in the beam emitting end of the laser apparatus according to the first embodiment and the pulsed laser beam in the beam emitting end of the laser apparatus according to the third comparative example.

Regarding the generation of the nonlinear phenomenon, there is no difference in the generation condition of the nonlinear phenomenon between the optical fiber laser 110 (FIG. 6) according to the second comparative example and the optical fiber laser 200 according to the first embodiment. However, the comparative result of the optical fiber laser 120 (FIG. 7) according to the third comparative example and the optical fiber laser 200 according to the first embodiment is shown in FIG. 13. FIG. 13 shows the spectrum with the same average output (5 W per beam emitting end) and the same pulse peak (approximately 15 kW per beam emitting end) in the same pulse operating state. Note that, in FIG. 13, G1310 shows the spectrum of the optical fiber laser 200 according to the first embodiment, and G1320 shows the spectrum of the optical fiber laser 120 according to the third comparative example. Based on the comparative result shown in FIG. 13, the nonlinear phenomenon; that is, SRS is suppressed in the configuration of the first embodiment, but SRS is considerably expressed in the configuration of the third comparative example. Accordingly, the configuration of the present invention is advantageous in cases where the lens chromatic aberration and wavelength loss characteristics become problems based on SRS.

Regarding the phase difference of light pulse between the beam emitting ends constituting the laser beam output port, when the pulse width is modulated in the order of several ns, it is also necessary to adjust the phase difference of light pulse between the beam emitting ends at a level of several ns. When considering the light propagation in the optical fiber constituting the light path from the seed light source to the respective beam emitting ends, a phase of approximately 5 ns will deviate between light path lengths of 1 m. In the configuration of the first embodiment, since the phase difference of light pulse between the beam emitting ends 70a, 70b is decided only based on the final-stage optical amplifiers AMP1$_1$, AMP1$_2$, the phase difference of light pulse can be absorbed by adjusting the light path length (fiber length) in the respective final-stage optical amplifiers AMP1$_1$, AMP1$_2$. For example, in the configuration of the first embodiment, the overall fiber length in the respective final-stage optical amplifiers AMP1$_1$ AMP1$_2$ is approximately 5 m, and the fiber length can be adjusted easily. Meanwhile, in the configuration (FIG. 6) of the second comparative example, since the phase difference of light pulses that are outputted from the respective beam emitting ends 70 is decided based on the overall fiber length in the laser 1 and the overall fiber length in the laser 2, it is necessary to adjust the fiber length and adjust the phase between the laser 1 and the laser 2 with the modulator 51, and the difficulty of the adjustment operation will increase. Moreover, with the configuration of the second comparative example, the overall fiber lengths in the laser 1 and the laser 2 are approximately 50 m, respectively, and the ratio of the fiber length adjustment of 1 m in relation to the overall fiber length that will affect the phase difference of light pulse differs from the second comparative example and the first embodiment in approximately a single digit, and it is evident that the difficulty of the adjustment operation in the second comparative example will increase.

Second Embodiment

Figure 14:
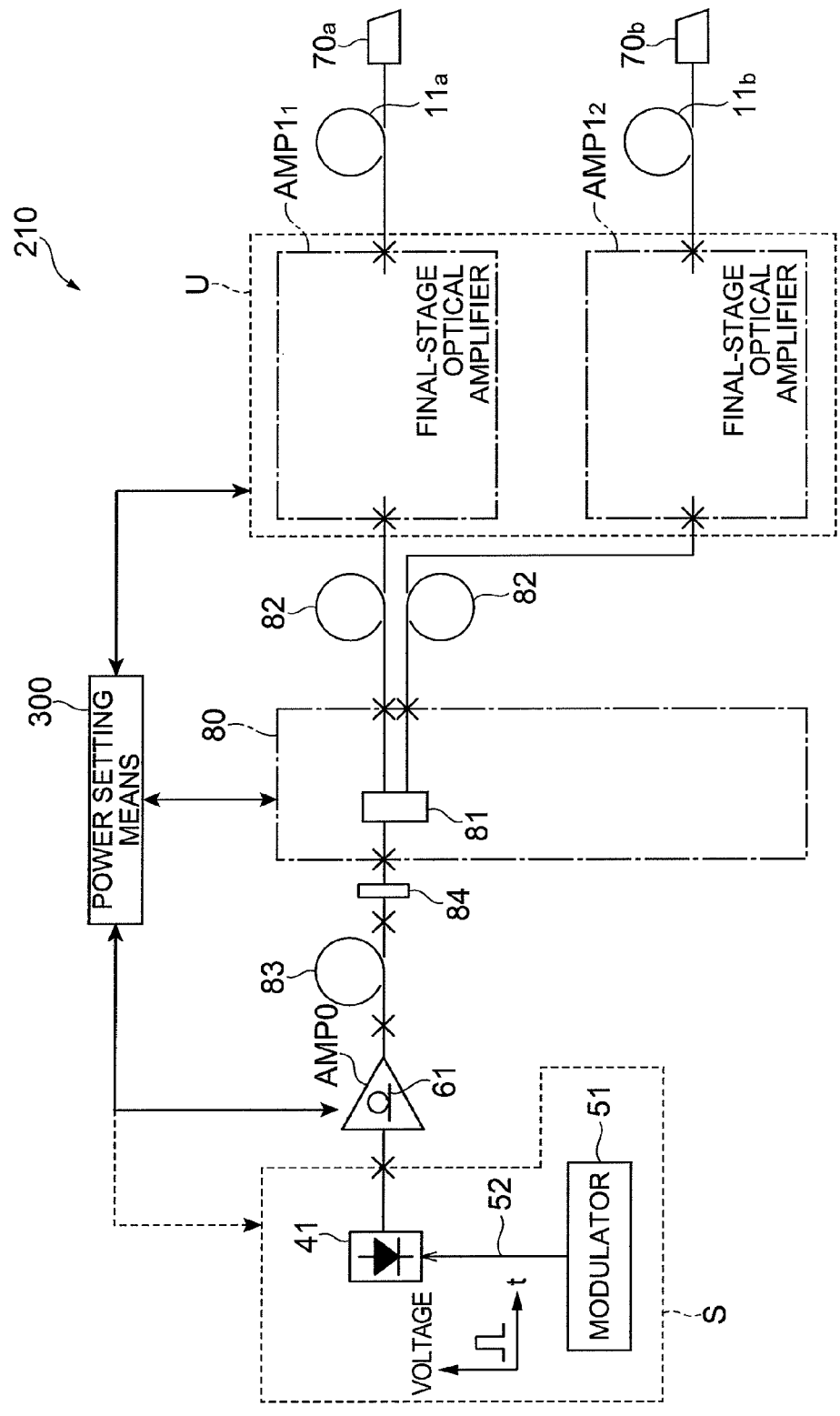
FIG. 14 is a view showing the configuration of a second embodiment of the laser apparatus (optical fiber laser) according to the second embodiment.

FIG. 14 is a view showing the configuration of the second embodiment of the laser apparatus (optical fiber laser) according to the present invention. The optical fiber laser 210 according to the second embodiment is the same as the foregoing first embodiment in that it comprises one light source S (including the seed light source 41 as the light-emitting device and the modulator 51), an intermediate optical amplifier AMP0, an optical branching device 80, an amplification unit U in which two final-stage optical amplifiers $AMP1_1$, $AMP1_2$ are disposed in parallel, and beam emitting ends 70a, 70b. Moreover, the optical fiber laser 210 according to the second embodiment comprises, similar to the optical fiber laser 200 according to the first embodiment, first light path adjustment optical fibers 82 disposed on the branch lines between the optical branching device 80 and the final-stage optical amplifiers $AMP1_1$, $AMP1_2$, and delivery optical fibers 11a, 11b disposed between the final-stage optical amplifiers $AMP1_1$, $AMP1_2$ corresponding one-on-one and the beam emitting ends 70a, 70b.

The optical fiber laser 210 according to the second embodiment differs from the optical fiber laser 200 according to the first embodiment in that it comprises a second light path length adjusting optical fiber 83, a band pass filter 84, and a power setting means 300.

The length of the second light path length adjusting optical fiber 83 is preferably set within a range where there are no problems with the SRS threshold. Moreover, the power setting means sets the power of the light to be amplified that is outputted from the seed light source 41 or the intermediate optical amplifier AMP0 according to the number of valid final-stage optical amplifier performing the amplifying operation (final-stage optical amplifiers each being inputted with the seed light pulse train, as the light to be amplified, separated by the optical branching device 80 and propagating on the associated branch line). Under normal circumstances, in the configuration where the intermediate optical amplifier AMP0 is disposed on the upstream side of the optical branching device 80, and the final-stage optical amplifiers $AMP1_1$, $AMP1_2$ are disposed on the downstream side of the optical branching device 80, the final-stage optical amplifiers $AMP1_1$, $AMP1_2$ are not constantly performing the amplifying operation. Namely, while the optical fiber laser 210 is operating, the number of valid final-stage optical amplifiers performing the amplifying operation will change. Accordingly, in the second embodiment, the power setting means 300 is provided for setting the power of the light to be amplified that is outputted from the light-emitting device or the intermediate optical amplifier according to the number of valid final-stage optical amplifiers (final-stage optical amplifiers performing the amplifying operation) that input the branch beams among the final-stage optical amplifiers $AMP1_1$, $AMP1_2$. By this, each power of the beams inputted to the valid final-stage optical amplifiers becomes constant regardless of the variation in the number of valid final-stage optical amplifiers.

The length of the second light path length adjusting optical fiber 83 is set within a range where there are no problems with the SRS threshold, and this "range where there are no problems with the SRS threshold" means that the "difference between the peak component of the wavelength of 1060 nm (wavelength of the light to be amplified) and the peak component of the wavelength of 1110 nm (center wavelength of the primary SRS) is 20 dB or more" based on the results and measurements of the simulation performed by the present inventors. Nevertheless, this kind of specific numerical value is subject to the fact that the amplification optical fiber 10 in the final-stage optical amplifiers $AMP1_1$, $AMP1_2$ is YbDF, and the amplification optical fiber 10 amplifies the light to be amplified that has a wavelength of 1060 nm. The primary SRS wavelength 1110 nm in relation to the fundamental wave (wavelength of 1060 nm of the light to be amplified) is the wavelength that generates gain in the final-stage optical amplifiers $AMP1_1$, $AMP1_2$. Moreover, in order to increase the gain of the fundamental wave, it is desirable to eliminate the wavelength components other than the fundamental wave. Since the ratio of the primary SRS beam of the SRS in relation to the fundamental wave is normally 20 dB or higher, the foregoing numerical value is adopted.

In the optical fiber laser 210 according to the second embodiment, a band pass filter 84 is provided between the second light path length adjusting optical fiber 83 and the optical branching device 80. The band pass filter 84 normally has an output difference of approximately 30 dB, and is able to sufficiently eliminate SRS. Moreover, with a configuration where an intermediate optical amplifier AMP0 exists between the light source S and the optical branching device 80, the band pass filter 84 is particularly effective since the ASE beam is eliminated in addition to the SRS beam.

The respective light path lengths from the light source S; in particular from the seed light source 41 to the beam emitting ends 70a, 70b are adjusted with the first light path length adjusting optical fibers 82 and the delivery optical fibers 11a, 11b in the first embodiment. Moreover, in the second embodiment, the respective light path lengths are adjusted with the first light path length adjusting optical fibers 82, the second light path length adjusting optical fiber 83, and the delivery optical fibers 11a, 11b. Specifically, the optical fibers 82, 83, 11a, 11b function as the margin fiber for arrangement or work (hereinafter referred to as the "arrangement/work margin") upon the optical fiber lasers 200, 210 actually being installed in the environment for use.

When the second light path length adjusting optical fiber 83 becomes long, as described above, the problems of SRS will arise, the primary SRS beam will occur, cause the gain to deteriorate in the final-stage, and induce the deterioration in the power of the light to be amplified as the fundamental wave. When the number of separations increases in the optical branching device 80, it may not be possible to supply the light to be amplified with sufficient power to the respective final-stage optical amplifiers $AMP1_1$, $AMP1_2$. Thus, in the optical fiber laser 210 according to the second embodiment, the power setting means 300 secures the necessary power in the final-stage optical amplifiers $AMP1_1$, $AMP1_2$, and adjusts the gain in the intermediate optical amplifier AMP0. The length of the second light path length adjusting optical fiber 83 is set to a length where the fundamental wave power will not deteriorate more than necessary due to the influence of the foregoing adjustment; that is, the influence of the primary SRS beam. The gain of the intermediate optical amplifier AMP0 is preferably set higher in relation to the power that is required in the respective final-stage optical amplifiers $AMP1_1$, $AMP1_2$ in consideration of the influence of SRS.

Even when a large arrangement/work margin is necessary, there is a limit in the length of the second light path length adjusting optical fiber 83. In this case, the insufficient margin is supplemented with the length of the first light path length adjusting optical fibers 82 and the delivery optical fibers 11a, 11b.

The first light path length adjusting optical fibers 82 propagate the light to be amplified (branch beams) separated by the optical branching device 80. The power of the branch beam in this case is low, and the first light path length adjusting optical fibers 82 will not be influenced easily by SRS in comparison to the other light path length adjusting optical fibers 83, 11a, 11b. Thus, the arrangement/work margin of the overall optical fiber laser 210 may be adjusted with the first light path length adjusting optical fibers 82.

The respective delivery optical fibers 11a, 11b are preferably set to a length that will not be subject to the influence of SRS unless they are to actively use the SRS beam. When there is no influence of SRS, the output light will become monochromatic light, and the problem of the output beam shape becoming distorted due to chromatic aberration can be resolved. However, when the length adjustment of the delivery optical fibers 11a, 11b is unsuccessful and the SRS component appears, PBGF (photonotic band gap fiber) may be applies as the elimination means thereof to the delivery optical fibers 11a, 11b.

There may be cases where the arrangement/work margin differs for each branch line positioned on the downstream side of the optical branching device 80. In this case, the phase of the output light of the respective beam emitting ends 70a, 70b could differ. The phase adjustment between the output beams may be performed, for example, by adjusting the length of the first light path length adjusting optical fibers 82.

In a configuration where the intermediate optical amplifier AMP0 is disposed on the upstream side of the optical branching device 80, and plural final-stage optical amplifiers $AMP1_1$, $AMP1_2$ are disposed on the downstream side of the optical branching device 80, the plural final-stage optical amplifiers $AMP1_1$, $AMP1_2$ as the constituent elements of the amplification unit U are not constantly performing the amplifying operation. Note that, in the second embodiment, although the number of final-stage optical amplifiers configuring the amplification unit U is two, as with the third embodiment explained later, N-number of (integer of two or more) final-stage optical amplifiers may also configure the amplification unit U. Namely, while the optical fiber laser 210 according to the second embodiment is operating, there is a group of valid final-stage optical amplifiers each inputting the associated one of branch beams separated, as the light to be amplified, by the optical branching device, and a group of invalid final-stage optical amplifiers each inputting no branch beam, and the ratio thereof may change. In this case, preferably, the power of the beams that are inputted to the valid final-stage optical amplifiers is constant regardless of the variation in the number of valid final-stage optical amplifiers performing the amplifying operation among the final-stage optical amplifier $AMP1_1$, $AMP1_2$ configuring the amplification unit U. Thus, the optical fiber laser 210 comprises the power setting means 300. The power setting means 300 functions to set the power of the light to be amplified that is outputted from the light source S (specifically the seed light source 41) or the intermediate optical amplifier AMP0 according to the number of valid final-stage optical amplifiers performing the amplifying operation.

When the number of valid final-stage optical amplifiers among the final-stage optical amplifier $AMP1_1$, $AMP1_2$ (N-number of final-stage optical amplifiers in the third embodiment described later) configuring the amplification unit U increases, the power of the inputted light to the respective valid final-stage optical amplifier will be small when the power of the light source S or the intermediate optical amplifier AMP0 is constant. In this case, there are the following possibilities; namely, (1) the ASE light may increase in the final-stage optical amplifier to which the branched seed light pulse train as the light to be amplified is inputted, (2) the extension of the pulse peak power may be impaired, or (3) the amplification fiber 10 may rupture.

Thus, the optical fiber laser 210 according to the second embodiment comprises the power setting means 300 for setting or adjusting the output power of the light source S or the intermediate optical amplifier AMP0 according to the number of valid final-stage optical amplifiers.

The output power adjustment of the intermediate optical amplifier AMP0 by the power setting means 300 may be performed merely by increasing or decreasing the output power of the pumping light source (LD) in the intermediate optical amplifier AMP0. However, with the output power adjustment of the light source S by the power setting means 300, the modulated voltage value from the modulator 51 and the temperature need to be changed when the drive current value supplied to the seed light source 41 is changed.

The optical fiber laser 210 according to the second embodiment may comprise a configuration of obtaining the processing output light of the intended power for each of the beam emitting ends 70a, 70b. The same applies to the third embodiment described later. In this case, each of the amplification optical fibers 10 used in the final-stage optical amplifiers $AMP1_1$, $AMP1_2$ constituting the amplification unit U may have different mode field diameters (MFDs) so as to efficiently amplify different output beams without being restricted by the nonlinear phenomenon. As a result of having different MFDs, a setting may be configured such that the pumping light power is supplied to the final-stage optical amplifier so that optical power according to the MFD is output.

As an advantageous difference of the output between the final-stage optical amplifiers, a power difference of 0.5 times or more with the lowest output power as the reference is preferably set. For example, when the final-stage optical amplifier $AMP1_1$ has the lowest output power 1, the output power of the final-stage optical amplifier $AMP1_2$ is 1.5 or more. More specifically, the "advantageous difference of the output" means that, when the MFD of the amplification optical fiber 10 in the wavelength of the light to be amplified differs 1.22 times ($\cong$1.2 times) with the lowest MFD as the reference, then the output power is approximately 1.49 times ($\cong$1.5 times).

The output power may be set to be the same in the respective output ports of the final-stage optical amplifiers $AMP1_1$, $AMP1_2$, but depending on the usage, there may be cases where the output power of a certain final-stage optical amplifier needs to be set advantageously.

In such a case, under an environment where the MFD in the wavelength of the light to be amplified of the used amplification optical fibers 10 is the same, problems related to SRS will arise due to the power increase when the gain is adjusted to deal with the foregoing situation. Moreover, amplification optical fibers with a difference core diameter may also be used to change the MFD, but when the core diameter is different, problems such as connection loss with the optical branching device 80 may occur. Thus, if possible, it is desirable to use the amplification optical fiber with the same core diameter as the output ports of the optical branching device 80 and with a different MFD. Note that the foregoing problems can be ignored when the core diameter of the respective ports in the optical branching device 80 is different. Moreover, as another method of changing the MFD of the amplification optical fiber, there is the method of changing the NA. When it is within a tolerable range of the connection loss, both the core diameter and the NA may be changed.

As the range of changing the MFD of the amplification optical fiber, for example, this will be 6 μm to 24 μm when the wavelength of the fundamental wave (seed light pulse separated as the light to be amplified) is 1060 nm. Note that the lower limit of the MFD is 6 μm, but when there are no special circumstances, the value of the MFD to be set should be a value that is greater than the foregoing lower limit since the influence of the nonlinear phenomenon will increase. Moreover, although the upper limit of the MFD is 24 μm, the output may become a multi mode, and, when there are no special circumstances, the value of the MFD to be set should be a value that is smaller than the foregoing upper limit. In order to cause the output light of the respective final-stage optical amplifiers $AMP1_1$, $AMP1_2$ to be a single mode, it is necessary to take sufficient care to make sure that the light to be amplified is inputted as a single mode at the fiber connecting part of the optical branching device 80 and the respective final-stage optical amplifiers $AMP1_1$, $AMP1_2$. By way of reference, with an amplification optical fiber with a core diameter of 10 μm and NA of 0.08, the MFD thereof is 12 μm.

To supplement, even when only the configuration of the respective final-stage optical amplifiers $AMP1_1$, $AMP1_2$ is changed, the output power adjustment between the final-stage optical amplifiers $AMP1_1$, $AMP1_2$ is possible. Specifically, the combiners and the core diameter of the amplification fibers of the final-stage optical amplifiers $AMP1_1$, $AMP1_2$ are made to differ. As a result of enlarging (or reducing) the core diameter, the nonlinear phenomenon can be suppressed, and the pulse energy and pulse peak can be increased when compared in terms of the average output.

The adjustment range of the core diameter is set as follows. Namely, the core diameter of a normally used optical fiber is approximately 10 μm (NA=approximately 0.08). In relation to the size of this core diameter, for example, a core diameter of 5 μm to 20 μm (NA=approximately 0.08) will be the valid range in consideration of the following two points; namely, (1) core diameter which enables the confinement with a double cladding structure, and (2) core diameter that is able to propagate while retaining, to a certain degree, the $M^2$ (beam quality) of the laser from the wavelength of the light to be amplified.

When the core diameter is less than 5 μm, the SRS component will increase. In this case, there are the following drawbacks; namely, (1) an adverse effect of the pulse peak will arise, and (2) the connection mismatch will increase. Meanwhile, when the core diameter is larger than 20 μm, the high order mode will become conspicuous in the wavelength (1060 nm) of the light to be amplified. In this case, there are the following drawbacks; namely, (1) an adverse effect on the stability of the power, and (2) deterioration in the beam quality upon collimating the laser output.

Third Embodiment

Figure 15:
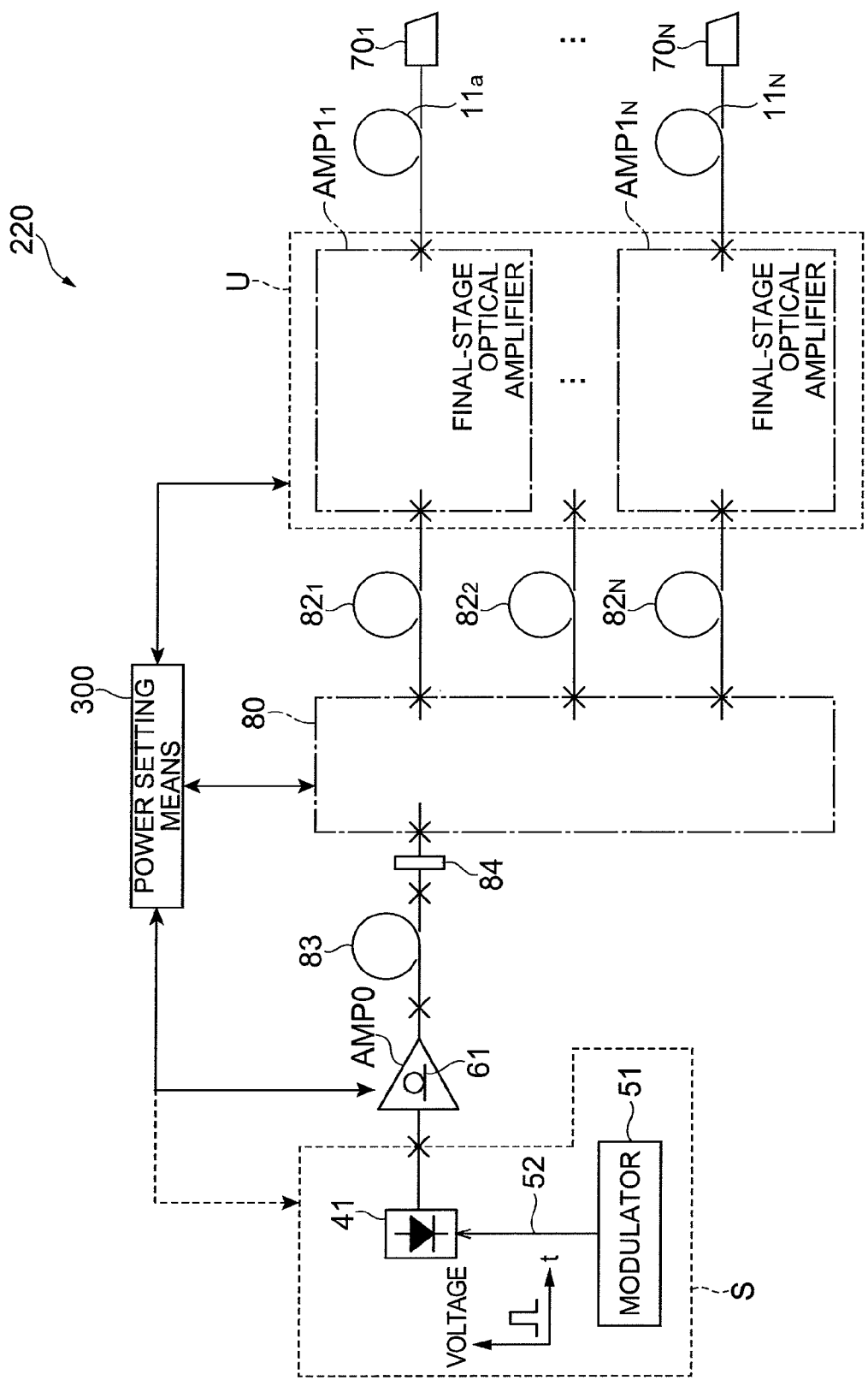
FIG. 15 is a view showing the configuration of a third embodiment of the laser apparatus (optical fiber laser) according to the present invention.
Figure 16:
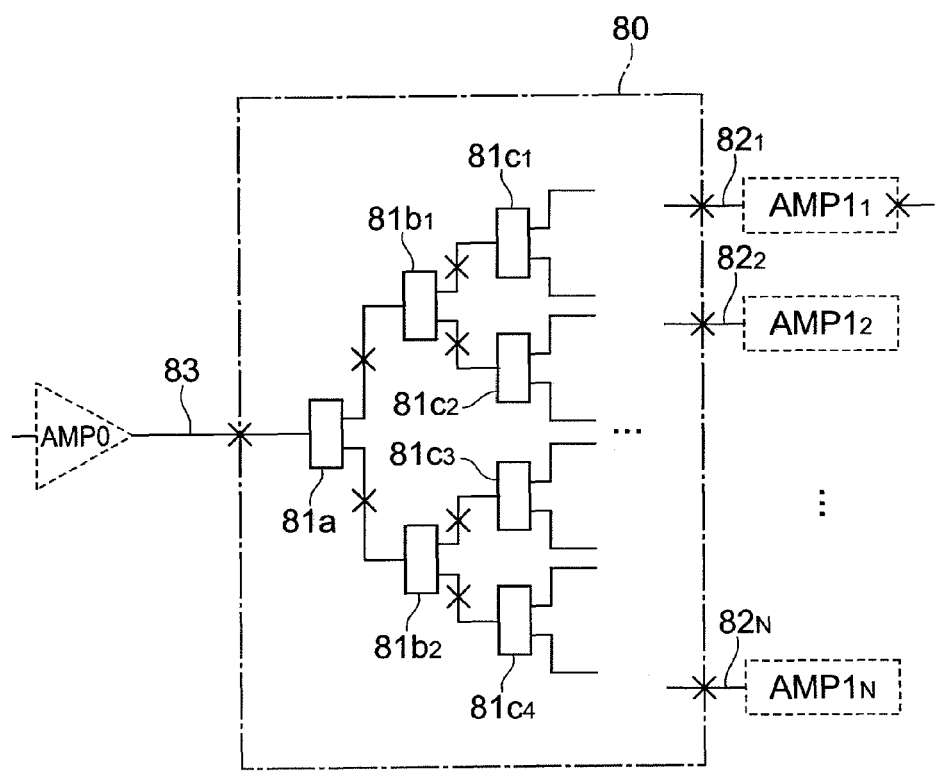
FIG. 16 is a view showing the configuration of the optical branching device in the laser apparatus according to the second and third embodiments.

The third embodiment of the laser apparatus according to the present invention is now explained. FIG. 15 is a view showing the configuration of the optical fiber laser 220 according to the third embodiment. The optical fiber laser 220 substantially comprises the same structure as the optical fiber laser 210 (FIG. 14) according to the foregoing second embodiment, but differs in that the optical branching device 80 is configured in plural stages, and comprises N (integer of three or more) beam emitting ends $70_1$ to $70_N$ serving as a laser beam output port. The configuration of the optical branching device 80 differs in accordance with the number of beam emitting ends serving as a laser beam output port. Namely, in the optical fiber laser 220 according to the third embodiment, the optical branching device 80 includes, as shown in FIG. 16, plural two-branch optical couplers $81_a$, $81_{b1}$, $81_{b2}$, $81_{c1}$, $81_{c2}$, $81_{c3}$, $81_{c4}$, . . . disposed so that no difference will occur in the light path length from the intermediate optical amplifier AMP0 to the respective final-stage optical amplifiers AMP1 to $AMP1_N$. Based on such a configuration, the optical branching device 80 has one input port corresponding to the seed light source 41, and plural output ports corresponding respectively to the beam emitting ends $70_1$ to $70_N$.

FIG. 15 shows the expanded configuration of the optical fiber laser 210 according to the second embodiment, but the configuration of the optical fiber laser 220 according to the third embodiment may also be the expanded configuration of the optical fiber laser 200 according to the first embodiment shown in FIG. 11 (configuration with no second light path length adjusting optical fiber 83, band pass filter 84, and power setting means 300). Moreover, in the configuration shown in FIG. 15, the obtained operation and effect are the same as the foregoing second embodiment.

In the optical fiber laser 220 according to the third embodiment, the final-stage optical amplifiers $AMP1_1$ to $AMP1_N$, connected to the optical branching device 80 via the first light path length adjusting optical fibers 82, correspond to one of the beam emitting ends $70_1$ to $70_N$. Moreover, a pair of the final-stage optical amplifier $AMP1_1$ and the beam emitting end $70_1$ corresponding one-on-one, . . . , and a pair of the final-stage optical amplifier $AMP1_N$ and the beam emitting end $70_N$ are respectively connected via the associated delivery optical fibers $11_1$ to $11_N$. The optical coupler constituting the optical branching device 80 is not limited to the foregoing 1×2 optical coupler (two-branch optical coupler with 1 input and 2 outputs), and may also be a 1×4 optical coupler (four-branch optical coupler with 1 input and 4 outputs), or a 2×2 optical coupler (optical coupler with 2 inputs and 2 outputs). When the output ratio of the 1×2 optical coupler is set to 1:2, and the 1×2 optical coupler (output ratio of 1:1) is disposed on the output port on the side with a large output ratio, three output ports with the same output can be prepared on the whole. In the case of the 2×2 optical coupler, one of the input ports may be used as the input port of the light to be amplified from the intermediate optical amplifier AMP0 positioned at the front stage, and the other port can be used for monitoring.

The respective final-stage optical amplifiers $AMP1_1$ to $AMP1_N$ disposed on the branch line positioned on the downstream side of the optical branching device 80 comprise one of the structures of FIGS. 12A to 12C as with the foregoing first and second embodiments.

The optical fiber laser 220 according to the third embodiment yields the same effects as the optical fiber lasers 200, 210 according to the first and second embodiments in relation to the power consumption, nonlinearity generation, phase difference of light pulse, and the like.

The optical fiber lasers 200 to 220 (FIGS. 11, 14 and 15) according to the first to third embodiments all comprise an intermediate optical amplifier AMP0 disposed between the light source S and the optical branching device 80, but this intermediate optical amplifier AMP0 is not necessarily essential. Particularly, in recent years, the performance of light-emitting devices is improving, and a light-emitting device capable of obtaining sufficient light output can also be applied to the seed light source 41 contained in the light source S.

However, when the number of final-stage optical amplifiers is numerous (increase in the number of beam emitting ends), the intermediate optical amplifier is required. In this case, the optical amplifier that functions as the intermediate optical amplifier may be disposed in the light source S. Particularly, in a configuration where the light source S including the optical amplifier and the optical branching device 80 are connected without going through the intermediate optical amplifier, as with the foregoing first to third embodiments, preferably, first light path length adjusting optical fibers 82 are disposed between the optical branching device 80 and the plural final-stage optical amplifiers, and a second light path length adjusting optical fiber 83 is disposed between the light source S and the optical branching device 80.

The second light path length adjusting optical fiber 83 is influenced by SRS, and the second light path length adjusting optical fiber 83 should be set to a length that is not affected by SRS. Meanwhile, since the first light path length adjusting optical fibers 82 are hardly influenced by SRS, it functions to adjust the light path length of the overall optical fiber laser. Nevertheless, in the case that the influence of SRS should be left to a certain degree, the length of the second light path length adjusting optical fiber 83 should be set to an intended length, and the first light path length adjusting optical fibers 82 may be used to adjust the light path length of the overall optical fiber laser.

As described above, in accordance with the present invention, since the configuration is such that the number of light-emitting devices as the seed light source is less than the number of final-stage optical amplifiers configuring the lasers, it is possible to reduce the number of optical amplifiers other than the final-stage and the number of light sources for the light to be amplified, and space saving and low power consumption are enabled.

As a result of disposing plural final-stage optical amplifiers corresponding respectively to plural beam emitting ends on the downstream side of the optical branching device for providing the laser beam to the plural beam emitting ends, it is not necessary to increase the laser beam power before branching, and the influence of the nonlinear phenomenon can be reduced as the overall device.

Since the configuration (including the seed light source) of the upstream side of the optical branching device is made to be common in relation to the plural beam emitting ends, the phase difference between the light pulses outputted from the beam emitting ends can be effectively reduced by adjusting and setting the length of light path after branching. Moreover, since the light path length does not need to be extended with the delivery optical fiber after the final-stage optical amplifier as a result of adjusting the light path length with the light path length adjusting optical fiber between the beam splitter and the final-stage optical amplifier, and the influence of the nonlinear phenomenon is prevent by that much.

What is claimed is:

1. A laser apparatus, comprising:
   a light-emitting device outputting light to be amplified;
   an optical branching device inputting the light to be amplified from the light-emitting device and separating the light to be amplified into plural beams;
   plural final-stage optical amplifiers respectively inputting the plural beams separated by the branching device and individually amplifying the plural beams inputted;
   plural beam emitting ends individually receiving the plural beams respectively amplified by the plural final-stage optical amplifiers and respectively outputting the plural beams received;
   an intermediate optical amplifier disposed on an optical path between the light-emitting device and the branching device; and
   a bandpass filter disposed on an optical path between the intermediate optical amplifier and the branching device,
   wherein output power of a pumping light source in the intermediate optical amplifier is set so that each power of the beams inputted to the final-stage optical amplifiers becomes constant without depending on a variation in the number of the final-stage optical amplifiers.

2. The laser apparatus according to claim 1, wherein light path lengths from the light-emitting device to the plural beam emitting ends are respectively set so that a difference between a maximum light path length and a minimum light path length is 1 m or less.

3. The laser apparatus according to claim 1, further comprising a first light path length adjusting optical fiber disposed on each of branch lines between the branching device and the plural final-stage optical amplifiers.

4. The laser apparatus according to claim 1, wherein an amplifying medium of each of the plural final-stage optical amplifiers is a Yb element-doped optical fiber.

5. The laser apparatus according to claim 1, wherein an amplifying medium of the intermediate optical amplifier is a Yb element-doped optical fiber.

6. The laser apparatus according to claim 1, further comprising a second light path length adjusting optical fiber disposed between the intermediate optical amplifier and the bandpass filter.

7. The laser apparatus according to claim 1, further comprising plural delivery optical fibers individually propagating the plural beams respectively amplified by the plural final-stage optical amplifiers, from the plural final-stage optical amplifiers to the plural beam emitting ends.

8. A laser apparatus, comprising:
   a light-emitting device outputting light to be amplified;
   an optical branching device inputting the light to be amplified from the light-emitting device and separating the light to be amplified into plural beams;
   plural final-stage optical amplifiers respectively inputting the plural beams separated by the branching device and individually amplifying the plural beams inputted; and
   plural beam emitting ends individually receiving the plural beams respectively amplified by the plural final-stage optical amplifiers and respectively outputting the plural beams received,
   wherein amplification optical fibers are used in at least two or more final-stage optical amplifiers among the plural final-stage optical amplifiers, the amplification optical fibers having different mode field diameters (MFDs) so that the output light powers do not coincide, and being respectively set to output light power according to the MFD.

9. The laser apparatus according to claim 8, further comprising an intermediate optical amplifier disposed on an optical path between the light-emitting device and the branching device.

10. The laser apparatus according to claim 8, wherein light path lengths from the light-emitting device to the plural beam emitting ends are respectively set so that a difference between a maximum light path length and a minimum light path length is 1 m or less.

11. The laser apparatus according to claim 8, further comprising a first light path length adjusting optical fiber disposed on each of branch lines between the branching device and the plural final-stage optical amplifiers.

12. The laser apparatus according to claim 8, wherein an amplifying medium of each of the plural final-stage optical amplifiers is a Yb element-doped optical fiber.

13. The laser apparatus according to claim 9, wherein an amplifying medium of the intermediate optical amplifier is a Yb element-doped optical fiber.

14. The laser apparatus according to claim 9, further comprising a second light path length adjusting optical fiber disposed between the intermediate optical amplifier and the branching device.

15. The laser apparatus according to claim 9, further comprising a bandpass filter disposed on an optical path on an optical path between the intermediate optical amplifier and the branching device.

16. The laser apparatus according to claim 8, further comprising plural delivery optical fibers individually propagating the plural beams respectively amplified by the plural final-stage optical amplifiers, from the plural final-stage optical amplifiers to the plural beam emitting ends.

* * * * *